US012146394B2

United States Patent
Chen et al.

(10) Patent No.: US 12,146,394 B2
(45) Date of Patent: Nov. 19, 2024

(54) CONTROLLING DOWNHOLE-TYPE ROTATING MACHINES

(71) Applicant: Upwing Energy, Inc., Cerritos, CA (US)

(72) Inventors: Kuo-Chiang Chen, Kennedale, TX (US); Patrick McMullen, Cerritos, CA (US); Christopher Matthew Sellers, Fullerton, CA (US)

(73) Assignee: Upwing Energy, Inc., Cerritos, CA (US)

( * ) Notice: Subject to any disclaimer, the term of this patent is extended or adjusted under 35 U.S.C. 154(b) by 92 days.

(21) Appl. No.: 16/235,971

(22) Filed: Dec. 28, 2018

(65) Prior Publication Data

US 2020/0208509 A1 Jul. 2, 2020

(51) Int. Cl.
| | |
|---|---|
| *E21B 43/12* | (2006.01) |
| *E21B 41/00* | (2006.01) |
| *E21B 47/06* | (2012.01) |
| *E21B 47/12* | (2012.01) |
| *F04D 13/10* | (2006.01) |
| *F04D 15/00* | (2006.01) |
| *F04D 25/06* | (2006.01) |
| *F04D 29/042* | (2006.01) |
| *F04D 29/048* | (2006.01) |
| *F04D 29/052* | (2006.01) |
| *F04D 29/058* | (2006.01) |

(52) U.S. Cl.
CPC ............ *E21B 43/128* (2013.01); *E21B 47/06* (2013.01); *E21B 47/12* (2013.01); *F04D 13/10* (2013.01); *F04D 15/0066* (2013.01); *F04D 25/0686* (2013.01); *F04D 29/042* (2013.01); *F04D 29/048* (2013.01); *F04D 29/052* (2013.01); *F04D 29/058* (2013.01); *E21B 41/0085* (2013.01)

(58) Field of Classification Search
CPC ............ F04D 13/08–10; F04D 15/0066; F04D 25/0686; F04D 27/0261; F04D 29/042; F04D 29/048; F04D 29/052; F04D 29/058; E21B 41/0085; E21B 43/128; E21B 47/06; E21B 47/12; E21B 47/008; E21B 41/02; F04B 47/00; F04B 47/02; F04B 47/04–10
USPC ....... 166/68–68.5, 72, 105; 417/410.3–410.5
See application file for complete search history.

(56) References Cited

U.S. PATENT DOCUMENTS

| | | | |
|---|---|---|---|
| 6,836,731 B1 | 12/2004 | Whalley et al. | |
| 6,907,375 B2 | 6/2005 | Guggari et al. | |
| 7,574,325 B2 | 8/2009 | Dykstra | |
| 7,833,947 B1 | 11/2010 | Kubala | |
| 7,963,327 B1 | 6/2011 | Saleri et al. | |

(Continued)

FOREIGN PATENT DOCUMENTS

WO WO-2015158734 A1 * 10/2015 ......... F04D 25/0686

OTHER PUBLICATIONS

U.S. Appl. No. 15/392,258, Filatov et al., filed Dec. 28, 2016.

(Continued)

*Primary Examiner* — Alexander B Comley
(74) *Attorney, Agent, or Firm* — Fish & Richardson P.C.

(57) ABSTRACT

A parameter of a magnetic bearing supporting a rotor in operation within a stator of the downhole-type rotating machine is measured. A speed of the rotor is controlled based on the measured parameter.

17 Claims, 13 Drawing Sheets

(56) References Cited

U.S. PATENT DOCUMENTS

| | | | |
|---|---|---|---|
| 8,145,427 | B1 | 3/2012 | Saleri et al. |
| 8,145,428 | B1 | 3/2012 | Saleri et al. |
| 8,175,751 | B2 | 5/2012 | Thakur et al. |
| 8,301,425 | B2 | 10/2012 | Dale et al. |
| 8,761,911 | B1 | 6/2014 | Chapman et al. |
| 9,041,534 | B2 | 5/2015 | McSheffrey |
| 9,085,412 | B1 | 7/2015 | Sasakura et al. |
| 9,747,569 | B2 | 8/2017 | McSheffrey |
| 9,767,421 | B2 | 9/2017 | Saleri et al. |
| 10,066,148 | B2 | 9/2018 | Luyster et al. |
| 2008/0262898 | A1 | 10/2008 | Tonchev et al. |
| 2010/0034491 | A1* | 2/2010 | Reid ............... F04D 29/057 384/97 |
| 2010/0150737 | A1* | 6/2010 | Anderson ........ E21B 47/047 417/44.1 |
| 2010/0206559 | A1 | 8/2010 | Sequeira, Jr. et al. |
| 2011/0168391 | A1 | 7/2011 | Saleri et al. |
| 2013/0110524 | A1 | 5/2013 | Saleri et al. |
| 2013/0110563 | A1 | 5/2013 | Saleri et al. |
| 2014/0039860 | A1 | 2/2014 | Carvajal et al. |
| 2014/0121972 | A1 | 5/2014 | Wessling et al. |
| 2014/0121973 | A1 | 5/2014 | Buchanan et al. |
| 2016/0273324 | A1* | 9/2016 | Yamaguchi ........ F04D 29/0516 |
| 2017/0046619 | A1 | 2/2017 | Towailib et al. |
| 2017/0298955 | A1* | 10/2017 | Gilarranz ............. F04D 17/12 |
| 2017/0335665 | A1 | 11/2017 | Saleri et al. |

OTHER PUBLICATIONS

Karmaoui et al., "Environmental Vulnerability to Climate Change and Anthropogenic Impacts in Dryland, (Pilot Study: Middle Draa Valley, South Morocco)," Journal of Earth Science & Climate Change, S11, Jan. 2014, 12 pages.

Liou et al., "A Generalized Water Quality Index for Taiwan," Environmental Monitoring and Assessment, vol. 96, Issue 1-3, Aug. 2004, 18 pages.

Saha et al., "Suitability Assessment of Surface Water Quality with Reference to Drinking, Irrigation and Fish Culture: A Human Health Risk Perspective," Bulletin of Environmental Contamination and Toxicology, vol. 101, Issue 2, Aug. 2018, 10 pages.

* cited by examiner

| | | Environment | |
|---|---|---|---|
| | | Reactive | Active |
| System (SCS/ESP) | Active | Characterization of Reservoir (well Testing) 502 | Adaptive System Control by Predicting Reservoir Performance 504 |
| | Reactive | Diagnostics/Prognostics of Elements 506 | Optimization of the System Performance Under External Disturbances 508 |

CONTROLLING DOWNHOLE-TYPE ROTATING MACHINES

TECHNICAL FIELD

This disclosure relates to control systems for downhole-type rotating machines.

BACKGROUND

Most wells behave characteristically different over time due to geophysical, physical, and chemical changes in the subterranean reservoir that feeds the well. For example, it is common for well production to decline. This decline in production can occur due to declining pressures in the reservoir, and can eventually reach a point where there is not enough pressure in the reservoir to economically realize production through the well to the surface. Downhole pumps and/or compressors can be deployed into the well to increase production. Additionally or alternatively, a top side compressor and/or pump are sometimes used to extend the life of the well by decreasing pressure at the top of the well.

SUMMARY

This disclosure relates to controlling downhole type rotating machines.

An example implementation of the subject matter described within this disclosure is a method of controlling a downhole-type rotating machine. The method includes the following features. A parameter of a magnetic bearing supporting a rotor in operation within a stator of the downhole-type rotating machine is measured. A speed of the rotor is controlled based on the measured parameter.

Aspects of the example implementation, which can be combined with the example implementation alone or in combination, include the following. The magnetic bearing is an axial magnetic bearing.

Aspects of the example implementation, which can be combined with the example implementation alone or in combination, include the following. The measured parameter comprises a parameter indicative of axial position of the rotor.

Aspects of the example implementation, which can be combined with the example implementation alone or in combination, include the following. The measured parameter comprises a parameter indicative of axial force on the rotor.

Aspects of the example implementation, which can be combined with the example implementation alone or in combination, include the following. An axial position of the rotor is controlled based on the measured parameter.

Aspects of the example implementation, which can be combined with the example implementation alone or in combination, include the following. The measured parameter includes a parameter indicative of radial vibration of the rotor.

Aspects of the example implementation, which can be combined with the example implementation alone or in combination, include the following. The downhole-type rotating machine includes a pump or compressor. The measured parameter includes a parameter indicative of a change in pressure ratio across the pump or compressor.

Aspects of the example implementation, which can be combined with the example implementation alone or in combination, include the following. The downhole-type rotating machine includes a pump or compressor. The measured parameter includes a parameter indicative of a temperature of fluid discharged from the downhole-type rotating machine.

Aspects of the example implementation, which can be combined with the example implementation alone or in combination, include the following. The downhole-type rotating machine includes a pump or compressor. The measured parameter includes a parameter indicative of a flowrate through the downhole-type rotating machine.

Aspects of the example implementation, which can be combined with the example implementation alone or in combination, include the following. The measured parameter includes a parameter indicative of a torque applied to the rotor.

Aspects of the example implementation, which can be combined with the example implementation alone or in combination, include the following. The measured parameter includes a parameter indicative of an axial displacement of the rotor over time.

Aspects of the example implementation, which can be combined with the example implementation alone or in combination, include the following. A density or viscosity of a fluid flowing through the downhole-type rotating machine is determined in response to the axial displacement of the rotor over time.

Aspects of the example implementation, which can be combined with the example implementation alone or in combination, include the following. How future flow characteristics of a production well housing the downhole-type rotating machine will change over time is determined based on the measured parameter or a predictive model. A speed of the rotor is changed based on future flow characteristics.

Aspects of the example implementation, which can be combined with the example implementation alone or in combination, include the following. An axial position of the rotor is oscillated based on the measured parameter.

An example implementation of the subject matter described within this disclosure is a downhole-type rotating system with the following features. A stator surrounds a rotor. The stator is configured to drive the rotor to rotate. A magnetic bearing supports the rotor to the stator. A controller is configured to measure a parameter of a rotor operation and control a rotational speed of the rotor based on the measured parameter.

Aspects of the example implementation, which can be combined with the example implementation alone or in combination, include the following. The magnetic bearing is an active magnetic thrust bearing.

Aspects of the example implementation, which can be combined with the example implementation alone or in combination, include the following. The magnetic bearing comprises a passive magnetic radial bearing and an active damper.

Aspects of the example implementation, which can be combined with the example implementation alone or in combination, include the following. The controller includes one or more processors and a non-transitory computer-readable storage medium coupled to the one or more processors and storing programming instructions for execution by the one or more processors. The programming instructions instruct the one or more processors to measure a parameter detected by the magnetic bearing. The programming instructions instruct the one or more processors to change a speed of the rotor based on the measured parameter.

Aspects of the example implementation, which can be combined with the example implementation alone or in combination, include the following. The programing instructions further instruct the one or more processors to change an axial position of the rotor. The programing instructions further instruct the one or more processors to measure a change in axial position of the rotor over time. The programing instructions further instruct the one or more processors to determine a property of a downhole fluid based on the measured change in axial position over time.

Aspects of the example implementation, which can be combined with the example implementation alone or in combination, include the following. The programing instructions further instruct the one or more processors to determine future well-flow characteristics based on a flow assurance model. The programing instructions further instruct the one or more processors to control a speed of the rotor based on the future well-flow characteristics.

An example implementation of the subject matter described within this disclosure is a method of controlling a downhole-type rotating machine. The method includes the following features. A parameter is measured with a magnetic bearing in response to rotor operation within a housing of the downhole-type rotating machine. A speed of the rotor or an axial position of the rotor is controlled based on the measured parameter.

Aspects of the example implementation, which can be combined with the example implementation alone or in combination, include the following. Changing the axial position of the rotor includes oscillating the axial position of the rotor. Oscillating the axial position of the rotor removes scale build-up on the downhole-type rotating machine.

Aspects of the example implementation, which can be combined with the example implementation alone or in combination, include the following. Changing the speed of the rotor includes reducing the speed of the rotor.

An example implementation of the subject matter described within this disclosure is a method of controlling a downhole-type rotating machine. The method includes the following features. An operating parameter of the downhole-type rotating machine is measured. An axial position of a rotor is controlled based on the measured operating parameter.

Aspects of the example implementation, which can be combined with the example implementation alone or in combination, include the following. Changing the axial position of the rotor comprises oscillating the axial position of the rotor. Oscillating the axial position of the rotor removes scale build-up on the downhole-type rotating machine.

Aspects of the example implementation, which can be combined with the example implementation alone or in combination, include the following. A speed of the rotor is changed based on the measured operating parameter.

Aspects of the example implementation, which can be combined with the example implementation alone or in combination, include the following. The details of one or more implementations of the subject matter are set forth in the accompanying drawings and the description below. Other features, objects, and advantages of the subject matter will be apparent from the description and drawings, and from the claims.

DESCRIPTION OF DRAWINGS

Like reference symbols in the various drawings indicate like elements.

DETAILED DESCRIPTION

This disclosure describes a control system of a downhole-type rotating machine, such as a compressor, blower, pump, or generator. The system described herein has control of several elements of operation. For example, an electric submersible pump (ESP) system can have variable speed drive located at a topside facility to control a motor downhole. There are also other elements in the well system which provide either information or actuation to control the well. For example, downhole sensors measure temperatures and pressures at different depths of the well. All of these components are linked together into a central control system that can be used to improve the performance of the well, in real-time (e.g., on the order of milliseconds) and automatically (e.g., with little to no operator intervention).

Figure 1:
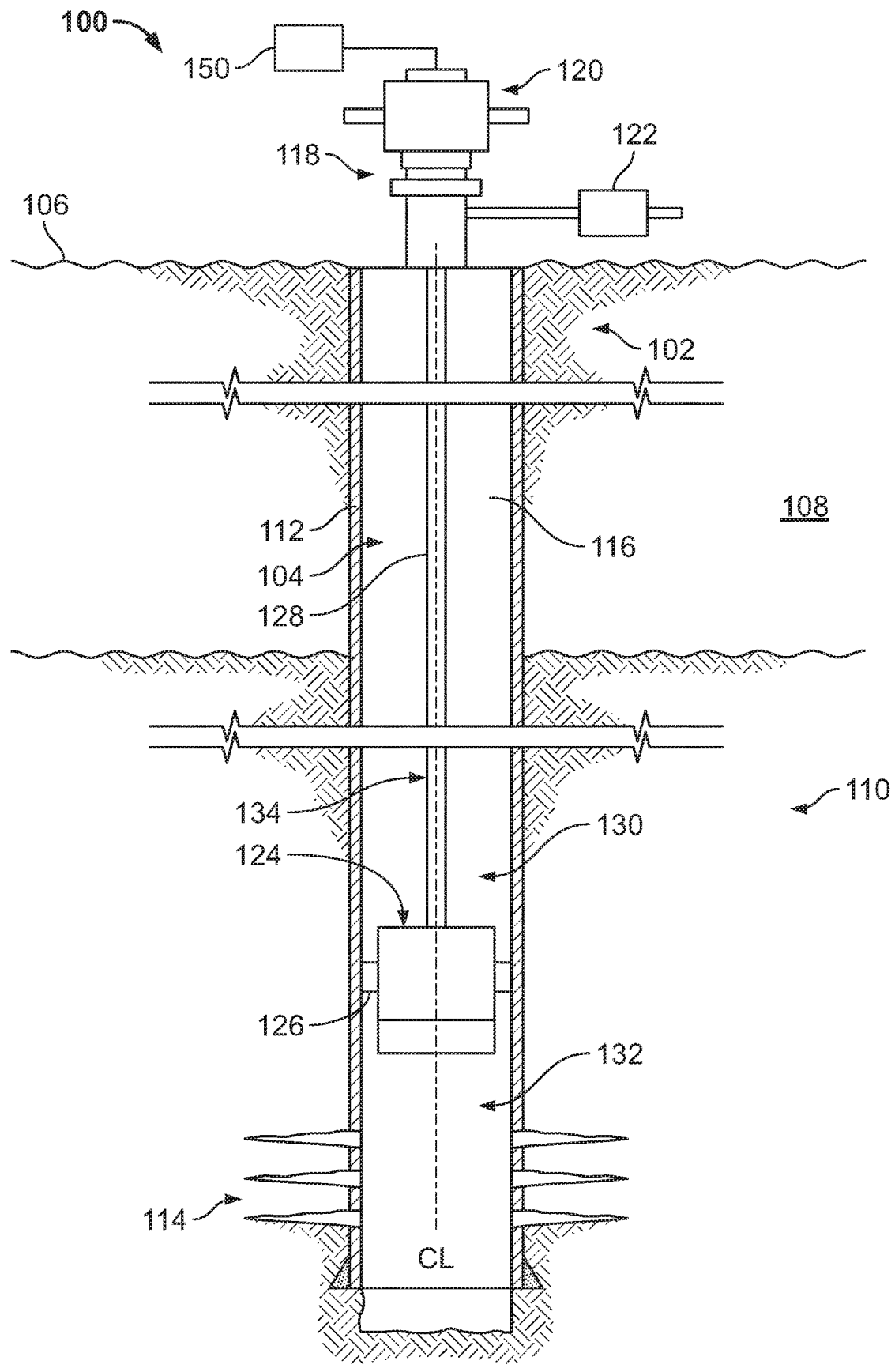
FIG. 1 is a schematic diagram of an example well system.

FIG. 1 depicts an example well system 100 constructed in accordance with the concepts herein. The well system 100 includes a well 102 having a wellbore 104 that extends from the terranean surface 106 through the earth 108 to one or more subterranean zones of interest 110 (one shown). The well system 100 enables access to the subterranean zones of interest 110 to allow recovery, i.e., production, of fluids to the terranean surface 106 and, in certain instances, additionally or alternatively allows fluids to be placed in the earth 108. In certain instances, the subterranean zone of interest 110 is a formation within the Earth defining a reservoir, but in other instances, the subterranean zone of interest 110 can be multiple formations or a portion of a formation. For the sake of simplicity, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a well that is used in producing hydrocarbon production fluid from the subterranean zones of interest 110 to the terranean surface 106. The well may produce only dry gas, liquid hydrocarbons, and/or water. In certain instances, the production from the well 102 can be multiphase in any ratio. The well can produce mostly or entirely liquid at certain times and mostly or entirely gas at other times. For example, in certain types of wells, it is common to produce water for a period of time to gain access to the gas in the subterranean zone. The concepts herein, though, are not limited in applicability to gas wells or even production wells, and could be used in wells for producing liquid resources such as oil, water or other liquid resources, and/or could be used in injection wells, disposal wells, or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the terranean surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threaded and/or otherwise) end-to-end. In FIG. 1, the casing 112 is perforated (i.e., having perforations 114) in the subterranean zone of interest 110 to allow fluid communication between the subterranean zone of interest 110 and the inner bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached to the wellhead 118. The Christmas tree 120 includes valves used to regulate flow into or out of the well 102.

FIG. 1 shows a surface compressor 122 residing on the terranean surface 106 and fluidly coupled to the well 102 through the Christmas tree 120. The surface compressor 122 can include a variable speed or fixed speed compressor. The well system 100 also includes a downhole-type artificial lift system 124 residing in the wellbore 104, for example, at a depth that is nearer to subterranean zone of interest 110 than the surface compressor 122. The surface compressor 122 operates to draw down the pressure inside the well 102 at the terranean surface 106 to facilitate production of fluids to the terranean surface 106 and out of the well 102. The downhole-type artificial lift system 124, being of a type configured in size and robust construction for installation within a well 102, assists by creating an additional pressure differential within the well 102. In particular, casing 112 is commercially produced in a number of common sizes specified by the American Petroleum Institute (the "API"), including 4½, 5, 5½, 6, 6⅝, 7, 7⅝, 16/8, 9⅝, 10¾, 11¾, 13⅜, 16, 18⅝ and 20 inches, and the API specifies internal diameters for each casing size. The downhole-type artificial lift system 124 can be configured to fit in and, (as discussed in more detail below) in certain instances, seal to the inner diameter of one of the specified API casing sizes. Of course, the downhole-type artificial lift system 124 can be made to fit in and, in certain instances, seal to other sizes of casing or tubing or otherwise seal to the wall of the wellbore 104.

Additionally, as a downhole-type artificial lift system 124 or any other downhole system configuration such as a pump, compressor, or multi-phase fluid flow aid that can be envisioned, the construction of its components is configured to withstand the impacts, scraping, and other physical challenges that the downhole-type artificial lift system 124 will encounter while being passed hundreds of feet/meters or even multiple miles/kilometers into and out of the wellbore 104. For example, the downhole-type artificial lift system 124 can be disposed in the wellbore 104 at a depth of up to 15,000 feet (4,572 meters). Beyond just a rugged exterior, this encompasses having certain portions of any electronics be ruggedized to be shock resistant and remain fluid tight during such physical challenges and during operation. Additionally, the downhole-type artificial lift system 124 is configured to withstand and operate for extended periods of time (e.g., multiple weeks, months, or years) at the pressures and temperatures experienced in the wellbore 104, temperatures which can exceed 400° F./205° C. and pressures over 2,000 pounds per square inch, and while submerged in the well fluids (gas, water, or oil as examples). Finally, as a downhole-type artificial lift system 124, the downhole-type artificial lift system 124 can be configured to interface with one or more of the common deployment systems, such as jointed tubing (i.e., lengths of tubing joined end-to-end, threaded and/or otherwise), a sucker rod, coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (e.g., coupling 220 discussed below, which can be a jointed tubing connector, coiled tubing connector, or wireline connector). In FIG. 1, the downhole-type artificial lift system 124 is shown deployed on wireline 128.

A seal system 126 integrated or provided separately with a downhole system, as shown with the downhole-type artificial lift system 124, divides the well 102 into an uphole zone 130 above the seal system 126 and a downhole zone 132 below the seal system 126. FIG. 1 shows the downhole-type artificial lift system 124 positioned in the open volume of the inner bore 116 of the casing 112, and not within or a part of another string of tubing in the well 102. The wall of the wellbore 104 includes the interior wall of the casing 112 in portions of the wellbore 104 having the casing 112, and includes the open-hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open-hole portions of the wellbore 104. In certain instances, the seal system 126 can form a gas and liquid tight seal at the pressure differential that the downhole-type artificial lift system 124 creates in the well 102. In some instances, the seal system 126 of the downhole-type artificial lift system 124 seals against the interior wall of the casing 112 or the open-hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type artificial lift system 124 from a pressure in the wellbore 104 uphole of the seal system 126 of the downhole-type artificial lift system 124. Although FIG. 1 includes both the surface compressor 122 and the downhole-type artificial lift system 124, in other instances, the surface compressor 122 can be omitted and the downhole-type artificial lift system 124 can provide the entire pressure boost in the well 102. While illustrated with the seal system 126, such a seal system can be eliminated in some instances. For example, when a packer and production tubing are used with the downhole-type artificial lift system 124.

In some implementations, the downhole-type artificial lift system 124 can be implemented to alter characteristics of a wellbore by a mechanical intervention at the source. Alternatively or in addition to any of the other implementations described in this specification, the downhole-type artificial lift system 124 can be implemented as a high flow, low pressure rotary device for gas flow in sub-atmospheric wells. Alternatively or in addition to any of the other implementations described in this specification, the downhole-type artificial lift system 124 can be implemented as a high pressure, low flow rotary device for gas flow in sub-atmospheric wells. Alternatively or in addition to any of the other implementations described in this specification, the downhole-type artificial lift system 124 can be implemented in a direct well-casing deployment for production through the wellbore. While the downhole-type artificial lift system 124 is described in detail as an example implementation of the downhole system, alternative implementations of the downhole system as a pump, compressor, or multiphase combination of these can be utilized in the well bore to effect increased well production.

The downhole system, as shown as the downhole-type artificial lift system 124, locally alters the pressure, temperature, and/or flow rate conditions of the fluid in the wellbore 104 proximate the downhole-type artificial lift system 124 (e.g., at the base of the wellbore 104). In certain instances, the alteration performed by the downhole-type artificial lift system 124 can optimize or help in optimizing fluid flow through the wellbore 104. As described above, the downhole-type artificial lift system 124 creates a pressure differential within the well 102, for example, particularly within the wellbore 104 the downhole-type artificial lift system 124 resides in. In some instances, a pressure at the base of the wellbore 104 is a low pressure (e.g., sub-atmospheric or insufficient to overcome the static head and friction losses of the well), so unassisted fluid flow in the wellbore can be slow or stagnant. In these and other instances, the downhole-type artificial lift system 124 introduced to the wellbore 104 adjacent the perforations 114 can reduce the pressure in the wellbore 104 near the perforations 114 to induce greater fluid flow from the subterranean zone of interest 110, increase a temperature of the fluid entering the downhole-type artificial lift system 124 to reduce condensation from limiting production, and increase a pressure in the wellbore 104 uphole of the downhole-type artificial lift system 124 to increase fluid flow to the terranean surface 106.

The downhole system, as shown as the downhole-type artificial lift system 124, moves the fluid at a first pressure downhole of the fluid module 200 to a second, higher pressure uphole of the downhole-type artificial lift system 124. The downhole-type artificial lift system 124 can operate at and maintain a pressure ratio across the downhole-type artificial lift system 124 between the second, higher uphole pressure and the first, downhole pressure in the wellbore. The pressure ratio of the second pressure to the first pressure can also vary, for example, based on an operating speed of the downhole-type artificial lift system 124, as described in more detail below. In some instances, the pressure ratio across the downhole-type artificial lift system 124 is less than 2:1, where a pressure of the fluid uphole of the downhole-type artificial lift system 124 (i.e., the second, higher pressure) is at or below twice the pressure of the fluid downhole of the downhole-type artificial lift system 124 (i.e., the first pressure). For example, the pressure ratio across the downhole-type artificial lift system 124 can be about 1.125:1, 1.5:1, 1.75:1, 2:1, or another pressure ratio between 1:1 and 2:1. In certain instances, the downhole-type artificial lift system 124 is configured to operate at a pressure ratio of greater than 2:1.

The downhole system, as shown as the downhole-type artificial lift system 124, can operate in a variety of downhole conditions of the wellbore 104. For example, the initial pressure within the wellbore 104 can vary based on the type of well, depth of the well 102, production flow from the perforations into the wellbore 104, and/or other factors. In some examples, the pressure in the wellbore 104 proximate a bottomhole location is sub-atmospheric, where the pressure in the wellbore 104 is at or below about 14.7 pounds per square inch absolute (psia), or about 101.3 kiloPascal (kPa). The downhole-type artificial lift system 124 can operate in sub-atmospheric wellbore pressures, for example, at wellbore pressure between 2 psia (13.8 kPa) and 14.7 psia (101.3 kPa). In some examples, the pressure in the wellbore 104 proximate a bottomhole location is much higher than atmospheric, where the pressure in the wellbore 104 is above about 14.7 pounds per square inch absolute (psia), or about 101.3 kiloPascal (kPa). The downhole-type artificial lift system 124 can operate in above atmospheric wellbore pressures, for example, at wellbore pressure between 14.7 psia (101.3 kPa) and 15,000 psia (103,421 kPa).

An amplifier drive and magnetic bearing controller 150 for a downhole system, shown as the downhole-type artificial lift system 124, is in some implementations, located topside to maximize reliability and serviceability. Details about the controller 150 are described later within this disclosure. A digital signal processor (DSP) based controller receives the position signals from sensor and/or sensor electronics within the downhole-type artificial lift system 124 and uses this for input as part of its position control algorithm. This algorithm output is a current command to an amplifier to drive coils of the active bearings within the downhole-type artificial lift system 124, thus impacting a force on the rotor (details are explained in greater detail later within the disclosure). This loop typically happens very fast, on the order of 1,000-20,000 times a second depending on the system control requirements. This control system is also capable of interpreting the bearing requirements to estimate forces and fluid pressures in the well. Analog circuit based controllers can also perform this function. Having this DSP or analog circuit based controller topside allows for easy communication, service, and improved up-time for the system, as any issues can be resolved immediately via local or remote support. Downhole electronics are also an option either proximate to the device or at a location more thermally suitable. In a downhole implementation, the electronics are packaged to isolate them from direct contact with the downhole environment. They offer better control options since they don't suffer with long cable delay and response issues.

Figure 2:
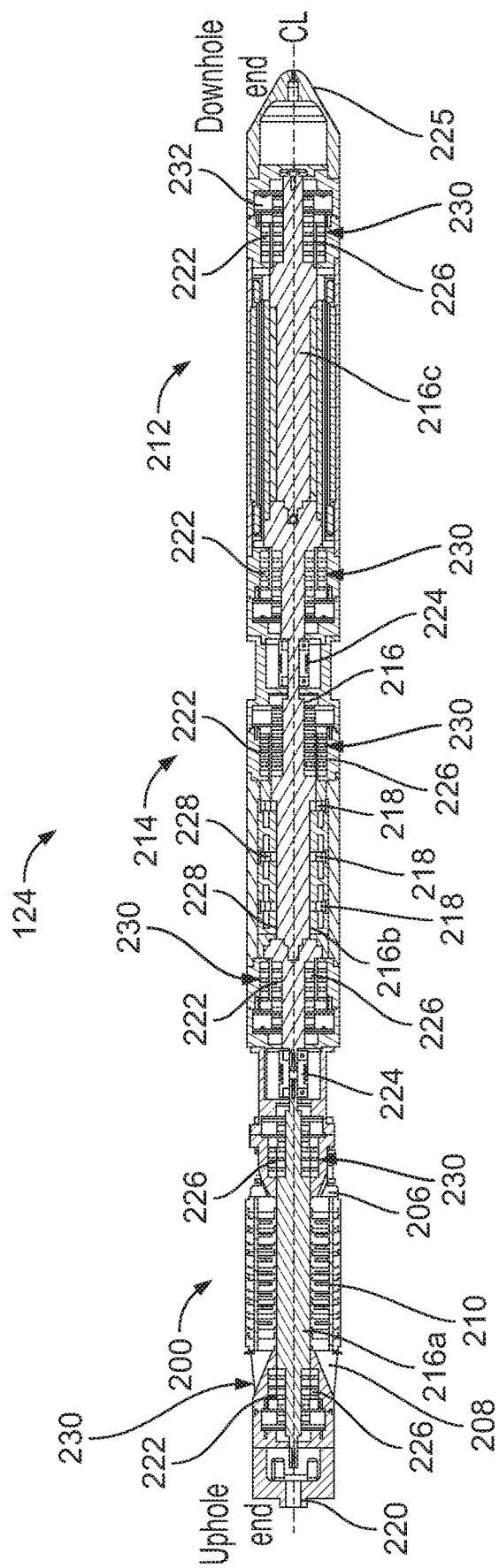
FIG. 2 is a side cross sectional view of an example downhole-type lift system.

The downhole system, shown as the downhole-type artificial lift system 124 is shown schematically in FIG. 1. FIG. 2 is a half side cross-sectional view of the example downhole-type artificial lift system 124. Referring to both FIGS. 1 and 2, the example downhole-type artificial lift system 124 includes a fluid module 200 and an electric machine 204. In the context of this disclosure, an uphole end or direction is an end nearer or moving in a direction towards the terranean surface 106. A downhole end or direction is an end nearer of moving in a direction away from the terranean surface 106. An implementation of the fluid module 200 within the well is described and the description is applicable even if the fluid module 200 is positioned outside of the wellbore 104. A coupling 220 is positioned at an uphole-end of the fluid module 200. The coupling can be of a type used for a wireline connection, a tubing connection, or any other connection configured to support the weight of the downhole-type artificial lift system 124. The coupling 220 can include a standard attachment method to attach the downhole-type artificial lift system 124 to a support system. For example, a threaded interface can be used for sucker rod, or a set of bolts can be used to attach two flanges together for production tubing.

The fluid module 200 includes an inlet 206 to receive a fluid at the first pressure downhole of the fluid module 200 and an outlet 208 to output the fluid at the second, higher pressure uphole of the fluid module 200. The inlet 206 can include a filter to limit particle sizes above a certain threshold from entering the downhole-type artificial lift system 124. A cylindrical outer housing 210 houses an impeller (described later) in fluid communication with the inlet 206 to receive the fluid from the wellbore 104 at the first pressure downhole of the fluid module 200 and to drive the fluid to the outlet 208 at the second, higher pressure uphole of the fluid module 200. The inlet 206 includes a series of holes evenly spaced around the circumference of the outer housing 210 and oriented in a downhole trajectory. The outlet 208 includes a series of holes evenly spaced around the circumference of the outer housing 210 and oriented in an uphole trajectory. With the downhole-type artificial lift system 124 residing in the wellbore 104, the inlet 206 is at a downhole end of the fluid module 200 and the outlet 208 is at an uphole end of the fluid module 200.

At a downhole end of the downhole-type artificial lift system 124 is a conical tip 225. The conical tip 225 reduces the pressure drop across the downhole-type artificial lift system 124. In some implementations, the conical tip 225 can house electronics that can be used in aspects of operation of the downhole-type artificial system 124 or for sensors.

In some instances, the downhole-type artificial lift system 124 can be positioned in the well with the downhole inlet 206 positioned adjacent to the perforations 114 in the wellbore 104. For example, the fluid module 200 can be positioned in the wellbore 104 such that the inlet 206 is disposed next to and immediately uphole of the perforations 114 to maximize or improve the fluid flow from the perforations into the fluid module 200. In some examples, the inlet 206 may not be adjacent to perforations 114, such as the inlet 206 being positioned greater than about twenty feet away from the perforations 114. In some instances, a speed of the fluid module 200 is adjusted based on the fluid flow from the subterranean zone into the wellbore 104 (e.g., via perforations 114). For example, as the fluid flow from the subterranean zone into the wellbore 104 decreases, a speed of the fluid module 200 can increase to draw more fluid flow from the subterranean zone into the wellbore 104.

As previously described, the downhole-type artificial lift system 124 moves the fluid from the downhole inlet 206 at the first pressure to the uphole outlet 208 at the second, higher pressure. This pressure differential promotes the fluid flow to move uphole of the downhole-type artificial lift system 124, for example, at a higher flow rate compared to a flow rate in a wellbore without a downhole-type artificial lift system 124. The fluid module 200 can operate at a variety of speeds, for example, where operating at higher speeds increases fluid flow, and operating at lower speeds reduces fluid flow. In some instances, the fluid rotor 216a, the thrust bearing rotor 216b, and/or the electric machine rotor 216c can operate at speeds between 600-3,600 revolutions per minute (rpm). In some instances, the fluid rotor 216a, the thrust bearing rotor 216b, and/or the electric machine rotor 216c can operate at speeds between 3,600-10,000 rpm. In some instances, the fluid rotor 216a, the thrust bearing rotor 216b, and/or the electric machine rotor 216c can operate at high-speeds, for example, 10,000-120,000 rpm. For the downhole-type artificial lift system 124 illustrated, the maximum operating speed is 60,000 rpm. Specific operating speeds for the downhole system are defined based on the fluid, pressures and flows for the well parameters and desired performance. Speeds may be as low as 10,000 rpm or as high as 120,000 rpm. Special design considerations are made to rotate at such speeds. For example, a high-speed machine (e.g., 10,000-120,000 rpm machine) includes higher strength materials for rotating components than a similarly sized low-speed machine (e.g., 600-3,600 rpm machine). Balancing requirements are more stringent for a high-speed machine as well. In general, a high-speed machine is arranged to reduce the radius of the spinning components. Such a task can be done by elongating the topology of the machine so that there is no need for component radial overlap. For example, a stator coil can be longitudinally separated from a coupling so that there is no radial overlap between the coupling and the stator coil. Such separation allows the stator coils and rotor to have a smaller diameter and tighter clearances as they do not have to surround a large coupling. In some implementations, the downhole-type artificial lift system 124 rotates the central shaft 216, which includes the fluid rotor 216a, the thrust bearing rotor 216b, and the electric machine rotor 216c, to rotate in unison. That is, the central shaft 216 rotates as a direct drive system. Having separate components of the central shaft that are coupled, but rotodynamically isolated (e.g. entirely isolated, substantially isolated, or reduce the transmission of rotodynamic forces) from one-another, allows the downhole-type artificial lift system 124 to rotate at high speeds while maintaining rotodynamic stability. This is because the first critical speed (first harmonic) of the individual components is higher than a single shaft of equivalent length to the smaller components. While the downhole system has an optimal speed range at which it is most efficient, this does not prevent the downhole system from running at less efficient speeds to achieve a desired flow for a particular well, as well as characteristics change over time.

FIG. 2 further illustrates an electric machine 212 and a thrust bearing module 214. The electric machine 212, the thrust bearing module 214, and the fluid module 200 are all coupled together on a central shaft 216. The electric machine 212 is configured to rotatably drive or be driven to generate electricity by the fluid module 200. That is, the electric machine 212 can be configured to act as a motor and/or generator. Throughout this description, electric machine, generator, and motor may be used interchangeably. The central shaft 216 is levitated and axially supported by one or more active magnetic thrust bearing assemblies 218 located in the thrust bearing module 214. One or more passive magnetic radial bearing assemblies 222 radially levitate and support the central shaft 216. While one of each electric machine 212, thrust bearing module 214, and fluid module 200 modules are shown, more than one of each or all are practical in this configuration, thus allowing for additional motor power, additional thrust load support, and additional flow or pressure capacity to be added independently of each other to best produce the specific well performance. In addition, while the order of electric machine 212, thrust bearing module 214, and fluid module 200 module from downhole to uphole is shown, each module functions independently and can be placed in other orders that best suit the operation and integration of each module. Additionally, the fluid module 200 can be a compressor, a liquid pump, a multiphase pump, or a combination thereof that best suits the fluids and conditions of the well to maximize well performance. In some implementation, the fluid module 200 can be a turbine. In addition, the use of passive magnetic radial bearing assemblies 222 and active magnetic thrust bearing assemblies 218 can be seen as one example of such an implementation of magnetic bearings, where active radial bearings and/or passive thrust bearings can be used instead of or in addition to, in any case to enhance the downhole system performance.

The passive magnetic radial bearing assemblies 222 include permanent magnets on the central shaft 216 and the outer housing 210. The magnets on the central shaft 216 are configured to repel the magnets on the outer casing 210 allowing the shaft to be levitated and supported by the magnets. The passive magnetic radial bearings do not include any electronic circuitry capable of actively altering the magnetic field to affect the supporting characteristics of the bearings. That is, an external power source is not needed to power the radial passive magnetic bearings. Both stator magnets and rotor magnets are canned or otherwise isolated to prevent process fluids from reaching the magnets and degrading performance. In some implementations, damping for the passive system, which can be either or both radial or axial, is provided by solid high electrically conductive plates or tubes, such as copper or aluminum.

In some implementations, an active damping circuit 232 can be included with the passive magnetic radial bearing assemblies 222. The active damping circuit 232 uses a coil to sense rotor radial motion and provide a current in size and frequency relative to this motion to a control board. The control board amplifies this signal and adjusts the relative polarity/phase to feed it back to a damping coil that reacts against the rotor field to resist the motion, thus damping out the motion. No radial position sensors or controller is required for the passive radial bearing operation. The active damping circuit 232 is able to adjust the magnetic field sufficiently enough to reduce vibration, but does not have the power to significantly affect the lifting or support characteristics of the bearing. In some implementations, the active damping circuit 232 acts as a generator that generates power when the axial gap decreases and thus powers a control coil to increase the levitating force. Thus, it doesn't need a sensor or an outside power source/controller. This approach can also be used for the axial axis, where a sense coil output sensing axial motion is amplified and fed to a damping to coil to react against the rotor field to resist motion. In some instances, the active damping circuit 232 can include the active damping circuit described in U.S. patent application Ser. No. 15/392,258.

The active magnetic thrust bearing assembly 218 and the passive magnetic radial bearing assembly 222 fully support the central shaft 216 with one or more electromagnetic fields. That is, the central shaft 216 is not physically coupled to the outer housing 210 during normal operation; there is no physical connection between the central shaft 216 and the outer housing 210. In other words, the shaft is spaced apart from the outer housing 210 and any associated mechanism connected to the outer housing 210 with a radial gap between the central shaft 216 and the outer housing 210.

In the illustrated implementation, the electric machine 212 is positioned downhole of the fluid module 200. The illustrated implementation also shows the active thrust bearing assembly residing between the electric machine and the fluid module 200. In some instances, the fluid module 200, the thrust bearing module 214, and the electric machine 212 can be assembled in a different order. For example, the thrust-bearing module 214 can be positioned downhole of the electric machine 212 or uphole of the fluid module 200.

In FIG. 2, the central shaft 216 comprises multiple sub-sections coupled together: a fluid rotor 216a, a thrust bearing rotor 216b, and an electric rotor 216c. Each sub-section is joined together by a coupling 224. The coupling 224 can be a bellows, quill, diaphragm, or other coupling type that provides axial stiffness and radial compliance. A bellows-style coupling includes a spring positioned between two shafts. The spring has a high radial torsional stiffness allowing for torque transmission, but a low lateral stiffness and a low lateral moment stiffness that allows for rotodynamic "play" between the shafts during operation. A bellows-style coupling can be attached to each shaft in a variety of ways, such as with a clamping hub located on either end of the bellows-style coupling. A quill-style coupling includes a shaft with a significantly greater length to diameter ratio than either shaft that is being coupled. The thinner cross-section allows for a high radial torsional stiffness and a high axial stiffness. The thinner cross-section also allows for a low lateral moment stiffness that allows for rotodynamic "play" between the shafts during operation. Specific dimensions and stiffnesses are specific for each application. In certain instances, the coupling 224 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. In some implementations, the central shaft 216 can include a single, unitary shaft that runs through the fluid module 200, the thrust bearing module 214, and the electric machine 212.

The use of magnetic bearings allows for a seal-less design. That is, the surface of the fluid rotor 216a, the thrust bearing rotor 216b, and the electric rotor 216c need not be sealed from and can all be exposed to the production fluid. As no mechanical bearings are used in the downhole-type artificial lift system 124, no lubrication is needed. As there is no lubrication or mechanical parts that have contamination concerns, no seals are needed for such components. Sensitive electronic and magnetic components can be "canned" or otherwise isolated from the downhole environment without affecting their electromagnetic characteristics. In some implementations, there is a common fluid path through the passive magnetic radial bearing assemblies 222 and the active magnetic thrust bearing assemblies 218 that allow fluid to flow through an "air-gap" 226 in each of the bearings. More specifically, the active magnetic thrust bearing assemblies 218 have thrust bearing gaps 228 between a bearing housing 230 and the central shaft 216. The gap is unsealed and is of sufficient size to allow fluid flow through the active magnetic thrust bearing assembly 218. The passive magnetic radial bearing assemblies 222 include one or more radial bearing gaps 226 between a bearing housing 230 and the central shaft 216. The radial bearing gaps 226 and the thrust bearing gaps 228 are sufficiently large to allow particulates to pass through without causing damage to rotating or stationary components. For example, in the illustrated implementation, an air-gap between the central shaft 216 (e.g., electric rotor 216c) and a stator of the electric machine 212 receives the fluid during operation of the downhole-type artificial lift system 124 downhole-type artificial lift system 124. That is, an air-gap between the electric rotor 216c and the electric stator of the electric machine receives the fluid during operation of the electric machine. The bearings do not require seals, as there is no physical contact between the central shaft 216 and the outer case 210. In other words, the central shaft 216 is spaced apart from the outer housing 210 and is not mechanically connected to the outer housing 210.

In some implementations, a magnetic coupling can be used to isolate certain modules from one another. For example, a magnetic coupling can be used between the electric machine module 212 and the thrust-bearing module 214. In such an implementation, the electric machine 212 is hermetically sealed from the environment of the wellbore 104.

Figure 3:
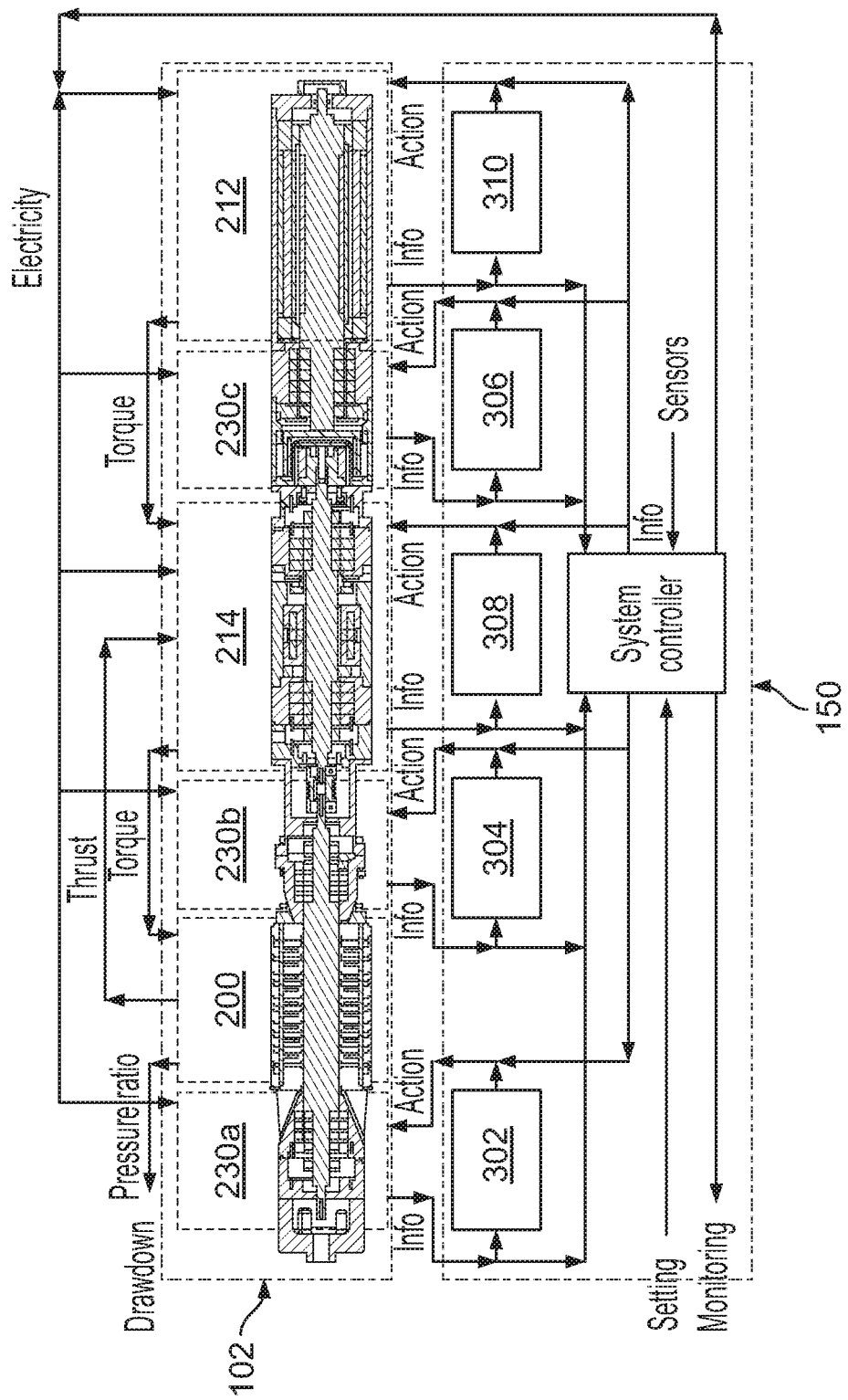
FIG. 3 is a schematic block diagram of an example control system for a downhole-type rotating machine.

FIG. 3 is a schematic block diagram of the control system 150 for the downhole-type artificial lift system 124. For the purposes of this disclosure, the downhole-type artificial lift system 124 includes a first magnetic radial bearing 230a located at an uphole end of the fluid module 200, a second magnetic radial bearing 230b located at a downhole end of the fluid module 200. An uphole end of the electric machine 12 also includes a motor radial magnetic bearing 230c. The thrust-bearing module 214 includes two additional radial magnetic bearings. Each magnetic radial bearing is coupled to a bearing sub-controller that can be included in the central controller 150. For example, the first magnetic radial bearing 230a is coupled a first bearing sub-controller 302, a second magnetic radial bearing 230b is coupled to a second bearing sub-controller 304, and a motor magnetic radial bearing 230c is coupled to a third bearing controller 306. The thrust-bearing module 214 can include radial magnetic bearings as well. The thrust-bearing module 214 is coupled to a thrust bearing sub-controller 308. Each sub-controller can be included in the central controller 150. Alternatively or in addition, there can also be a single, central magnetic bearing controller for all radial and axial magnetic bearings, or multiple controllers. The electric motor module 212 is coupled to a motor controller 310 that can be included within the central controller 150. The electric motor controller 310 can include a variable speed/frequency drive.

One or more of the magnetic bearings can be either an active magnetic bearing, or a passive magnetic bearing with active damping. The active component of the magnetic bearings is controlled and monitored by its respective sub-controller. All of the actions fed to each magnetic bearing by the respective sub-controller is recorded and/or monitored by the central control system 150. Any information detected by the active bearing systems is also recorded and/or monitored by the central control system 150. For example, a rotor position, velocity, and/or acceleration can be monitored and/or recorded by the central controller 150. As raw, analog signals are recorded and/or monitored by the central controller, peak-to-peak signal analysis can be performed. For example, a change in position can be monitored based on the extremes of the position change, rather than the root mean square (RMS) of the position change. A great deal of information about system operation and the wellbore environment can be determined from such raw signals. For example, a Fast Fourier Transform (FFT) of the raw signal can be taken to analyze amplitudes of individual active harmonics of the rotating components. Such information can be used to diagnose or predict failure mechanisms. For example, a high first and/or second harmonic can be indicative of a coupling misalignment or rotor imbalance. As the signals from all of the active bearing components are analyzed simultaneously, diagnostics and predictions can be determined within individual components of the machine. For example, a high momentary radial displacement amplitude in the first bearing 230a and the second bearing 230b within the fluid module 200 combined with a small radial displacement amplitude from the motor bearing 230c can be indicative of a slugging event. More examples of such diagnostic and prognostic capabilities and methods are described later within this disclosure. While described as measuring analog signals, the controller can record and/or monitor digital signals in a similar manner.

The controller 150 takes all of the raw information and takes an action on the system in response to the information. That is, the controller measures a parameter with a magnetic bearing in response to the central shaft 216 operation within the housing of the downhole-type artificial lift system 124. The controller 150 responds to the measured parameter. For example, the controller 150 can control a speed of the rotor 216 or an axial position of the rotor 216 based on the measured parameter. Controlling a speed of the rotor can include increasing, decreasing, or maintaining the RPMs of the rotor. With an active thrust-bearing module 214, the axial position of the rotor can be changed within the housing. Such changes can adjust clearances within the downhole-type artificial lift system 124. In some implementations, changing the axial position of the rotor includes oscillating the axial position of the rotor. Such an oscillation can be used to remove scale build-up on the downhole-type artificial lift system 124 or measure fluid properties within the wellbore 104.

Figures 4, 5:
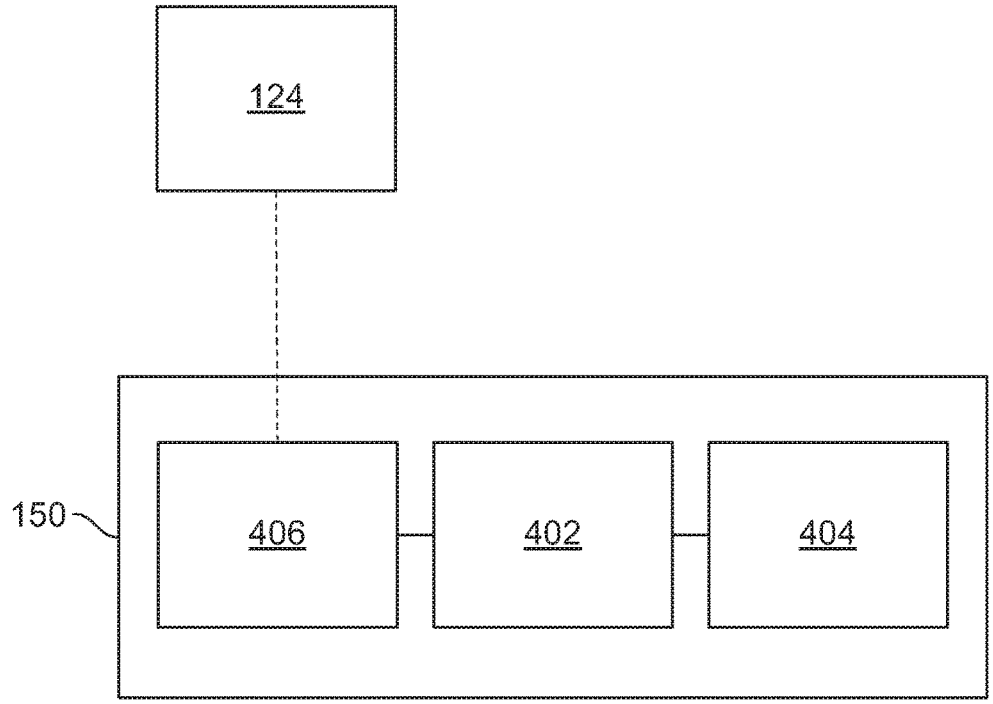
FIG. 4 is a schematic block diagram of an example controller that can be used with aspects of this disclosure.
FIG. 5 is a table describing potential operating modes that can be used with the downhole-type lifting system.

As shown in FIG. 4, the controller 150 can include a one or more processors 402 and non-transitory memory 404 containing instructions to facilitate sending and receiving signals through an input/output (I/O) interface 406. The controller can communicate with any aspect of the downhole-type artificial lift system 124 (FIG. 1), for example, the magnetic bearings 230. In some implementations, the controller 150 can be entirely located at the surface outside the wellbore 104. In some implementations, the controller 150 can be located within the wellbore 104. In some implementations, the controller can be a distributed controller; for example, a portion of the controller 150 can be located within the wellbore 104, while another portion of the controller 150 can be located at the surface outside the wellbore 104. In some implementations, the controller 150 can be only or in part an analog circuit based control.

The present disclosure is also directed to a method of monitoring, controlling, and using the downhole-type artificial lift system 124. To monitor and control downhole-type artificial lift system 124, the controller 150 is used in conjunction with sensors (e.g., magnetic bearings, magnetic bearing dampers, velocity sensors, transducers, thermocouples, flow sensors, fluid composition sensors) to measure parameters of the production fluid and the downhole-type artificial lift system 124 at various positions within the wellbore 104 and the downhole-type artificial lift system 124. Input and output signals, including the data from the sensors, controlled and monitored by the controller 150, can be logged continuously by the controller 150 and stored in a memory 404 coupled to the controller 150. The input and output signals can be logged at any rate desirable by the operator of the downhole-type artificial lift system 124. The controller 150 can also be used to operate and control any motors, bearings, valves, or flow control devices disclosed herein. Furthermore, the controller 150 can be used with the downhole-type artificial lift system 124 to operate the downhole-type artificial lift system 124 in any matter described herein. In some implementations, the controller 150 can be used to operate other devices, such as a topside pump, compressor, or separator in conjunction with the downhole-type artificial lift system 124.

Various tests and sensors can be used to determine properties of the production fluid. For example, conductivity of fluid can be tested by pulsing voltage across a set of electrodes at a wellbore location with good mixing that is protected from debris accumulation. Such a test can be used to determine a potential salinity of the production fluid and/or estimate water cut.

Adjusting operation parameters of the downhole-type lifting device 124 can also be used to determine properties of the production fluid. For example, a rapid change in motor speed or axial position of the central shaft 216 (shock upward, shock downward) can produce responses that are usable in various equations useful for determining multiphase fluid composition. In addition to solving for the equations of state alterations to the downhole-type lift system can be determined with regard to its response at different flow rates once the fluid composition is known. Such alterations can include material build up, material removal, degradation of stator windings or degradation of control circuits. Further, prediction of mean-time to failure can be used to send warnings to an operator to plan for a workover in advance of an actual mechanical failure. Alternatively or in addition fast application of a change in speed or a change in thrust could be used to periodically clean the system of debris or prevent a gas lock situation in the application of an ESP or mixed flow pump. More detailed examples of various diagnostic, prognostic, and mitigation techniques are discussed later within this disclosure.

The memory 404 can store programming instructions for execution by the one or more processors 402. For example, the processors can execute programming instructions to measure and/or monitor a parameter detected by the magnetic bearing and change a speed of the rotor based on the measured parameter. That is, the magnetic bearing is acting as both a sensor and an actuator. The controller 150 interprets the signal from the magnetic bearing and directs a current to control the magnetic field emitted by the magnetic bearing. Alternatively or in addition, the processors can execute programing instructions to direct the thrust-bearing module 214 to change an axial position of the rotor, measure a change in axial position of the rotor over time, determine a property of a downhole fluid based on the measured change in axial position over time. Further details on this process are described later in this disclosure. Alternatively or in addition, the one or more processors can execute programing instructions to determine future well-flow characteristics based on a flow assurance model and control a speed of the rotor based on the future well-flow characteristics. Further details on this process are described later in this disclosure.

FIG. 5 is a table 500 describing potential operating modes that can be used by the controller 150 to operate the downhole-type artificial lift system 124. The table is divided into four sections or modes. For each mode, the system is in either an active or a reactive state. An active state for the system is where the system is not in a fully autonomous mode. For example, the system may maintain a pressure ratio or speed, but it will not alter set-points to compensate for outside environmental changes without external input to do so. An example outside environmental change can include a slugging event. A reactive state for the system is where the system will react to or compensate for outside environmental changes, for example, by adjusting a set-point. For example, during a slugging event, the system can change the motor speed and adjust a force on one or more of the bearings to compensate for the change in load automatically and without external intervention. The environment is in a reactive state during steady state operation. For example, after start-up procedures have been conducted and the well is producing a steady flow without slugging. The environment is in an active state during non-steady state operation, for example, during start-up or during a slugging event. In general, "active" and "reactive" are indicative of a leading change and a following change, that is, an "active" component is an independent variable that changes, and the "reactive" component is a dependent variable that changes in response to the active component.

The first mode 502 occurs when the downhole-type artificial lift system acts in an active mode while the environment is in a reactive mode. This operation mode is often used to help characterize or test the well. During steady state operations, changing a set-point of the system, such as RPM or target pressure ratio, and measuring how the well reacts can result in useful information about the well. Such information can be used in a reservoir or well model. For example, one can both increase and decrease the flow rate on demand. Such a capability can provide more information of the reservoir. Example of this mode in operation are described later within this disclosure.

The second mode 504 occurs when the downhole-type artificial lift system acts in an active mode while the environment is in an active mode. This operation mode is often used to help characterize the well. During steady state operations, set-points of the system, such as RPM or target pressure ratio, are held at a steady state while the well operates in an unsteady state, such as start-up or a slugging event. By isolating one set of variables, namely the system operation, the characteristics of the well can be determined and predicted in the future. In the same operating mode, after the well has been characterized, a timed start-up procedure, with pre-set changes to RPMs, pressure ratios, and other variables, may be used to account for predictable non-steady state well behaviors. In general, an understanding of the reservoir (environment) is sufficient such that the compressor (system) can predict the change of the reservoir. For example, a compressor can predict and proactively shift its operating conditions "actively" so as to accommodating the predicted changes of the reservoir. Note that the reservoir is not reacting to the compressor, but changing by itself.

Therefore both the compressor (system) and the reservoir (environment) are in the active mode. Example of this mode in operation are described later within this disclosure.

The third mode 506 occurs when the downhole-type artificial lift system acts in an reactive mode while the environment is also in a reactive mode. Such an operating mode can be used for diagnostic purposes. For example, actively changing the RPMs after an unexpected change in pressure ratio can be used to determine if a gas pocket is trapped in the fluid module 200. Such an operation mode can be used to determine if parts of the compressor are degraded or damaged. For example, after constant attack by solids in the flow streams, the compressor blades may be eroded, and the performance characteristic of the compressor is not the same as before and the flow from the reservoir is lowered. When this happens, neither the compressor (controller) nor the environment is taking the lead to change, but both reactive to the change of damaged parts. Thus, the diagnostic capability of the compressor controller should identify the need of maintenance. Example of this mode in operation are described later within this disclosure.

The fourth mode 508 occurs when the downhole-type artificial lift system acts in an reactive mode while the environment is also in a reactive mode. Such an operating mode can be used to allow the downhole-type lift device 124 to react to changes in the outside environment, such as during a slugging event, with no operator intervention. For example, actively changing the RPMs and bearing damping factors during a slugging event and returning to steady state operation after the slugging event has passed. Example of this mode in operation are described later within this disclosure.

The following paragraphs describe specific scenarios that the control system 150 can experience and react to with no operator intervention. The following scenarios are only examples. The autonomous features described herein can be applied to a number of site-specific scenarios without operator intervention. The following scenarios should not be considered a complete list of the capabilities of the controller 150 or the downhole-type artificial lift system 124.

Figure 6:
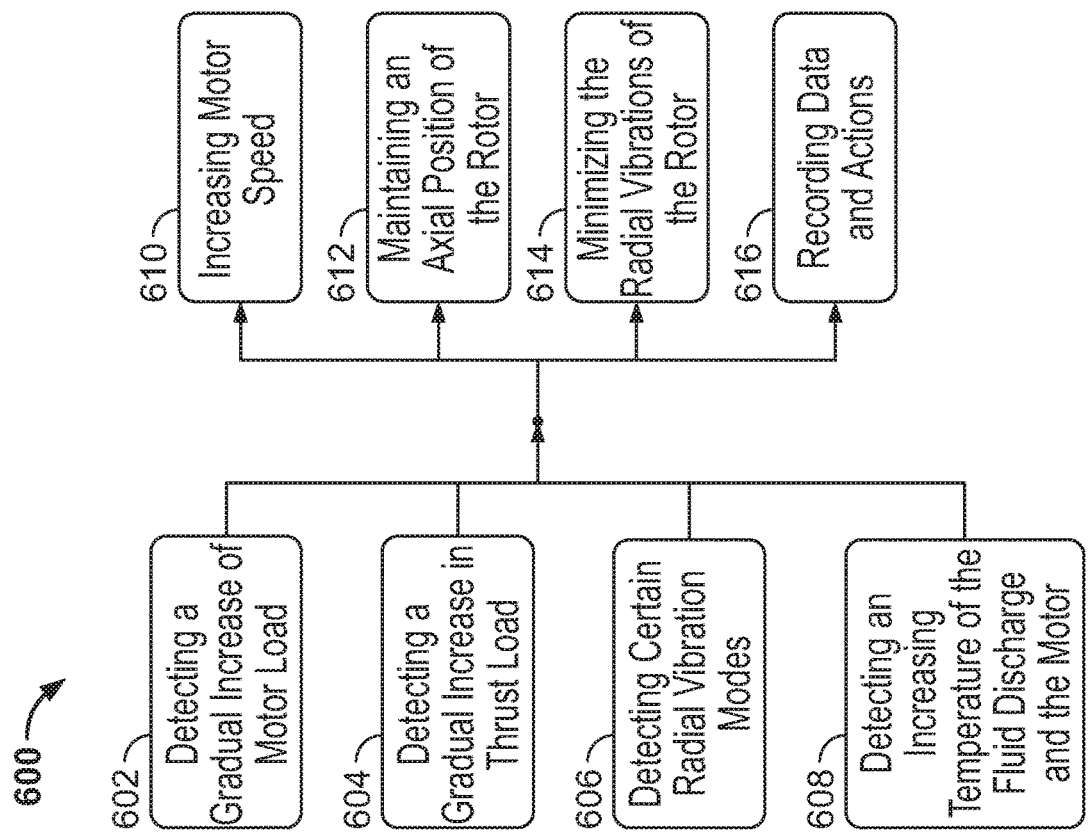
FIG. 6 is a flowchart of an example method that can be used with aspects of this disclosure.

FIG. 6 is a flowchart of an example method 600 for automation of conditioning and start-up for the downhole-type artificial lift system 124. The method 600 can be applied to either downhole-type compressors or ESPs. In some implementations, the method 600 is implemented by the controller 150 and/or the downhole-type artificial lift system 124. At 602, a gradual increase of motor load is detected by a sensor that communicates a value to the controller 150. At 604, a gradual increase in thrust load is detected by a sensor that communicates a value to the controller 150. In some instances, during the start-up process, a speed of the system can increase from 0 to 50,000 rpm within seconds, but more than likely one would like to increase the speed in stepped intervals. For example, the system can accelerate from 0 to 10,000 rpm on the order of seconds, then accelerate from 10,000 to 20,000 rpm on the order of seconds, and so on until a desired speed is reached. Thrust measurements can be taken during such a start-up process and can be compared with an expected value. At 606, certain radial vibration harmonics are detected by a sensor that communicates a value to the controller 150. In this instance, the vibration modes are indicative of start-up operations. At 608, an increase in motor temperature and an increase in fluid discharge temperature from the fluid module 200 are detected by a sensor that communicates a value to the controller 150. Based on the detected information, the following actions are taken by the controller. At 610, the motor speed is increased and adjusted dynamically, for example, by the controller 150 dynamically altering the frequency of the VFD, to minimize axial oscillations and radial vibrations. For example, during start-up, an excessive vibration is detected at 5,000 rpm, the controller can slow down the acceleration or lower the speed back to 3,000 rpm to avoid damage the compressor. Once the vibration is no longer detected, the controller can attempt to increase the speed again. At 612, an axial position of the central shaft 216 is maintained by changing a magnetic field within the thrust bearing module 214. At 614, the radial vibrations of the central shaft 216 of the motor 212 are minimized (e.g., reduced). Such an action can be taken by the controller 150 increasing a damping factor on the magnetic bearings. At 616, all data and actions are digitally recorded by the controller 150 in a computer readable format for later monitoring and analysis.

Figure 7:
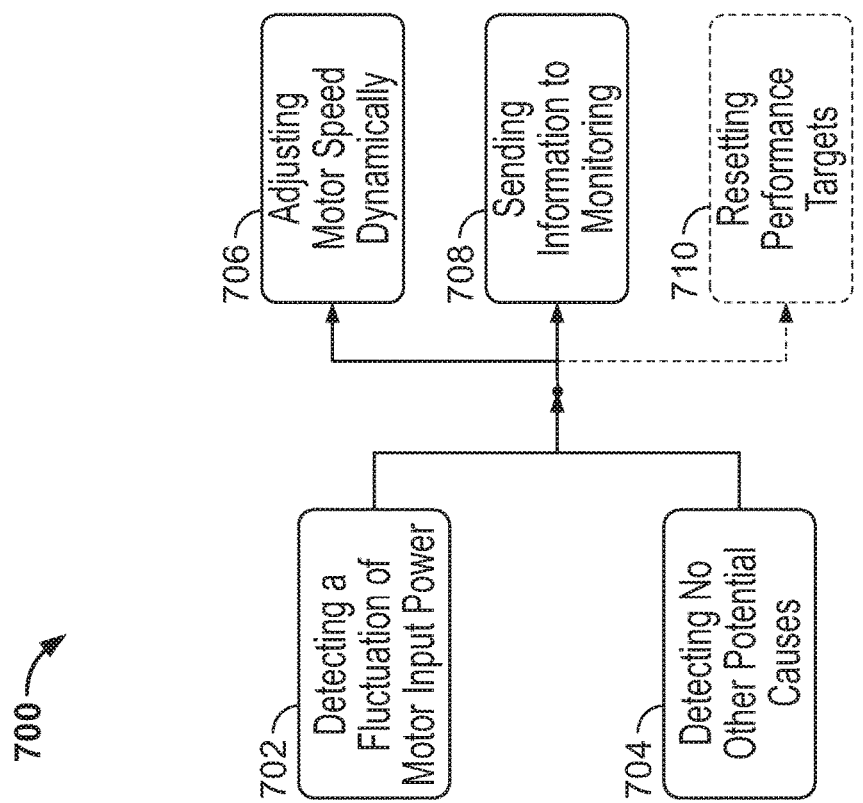
FIG. 7 is a flowchart of an example method that can be used with aspects of this disclosure.

FIG. 7 is a flowchart of an example method 700 for minimizing re-starts due to unstable electricity supply. The method 700 can be applied to either downhole-type compressors or ESPs. In some implementations, the method 700 is implemented by the controller 150 and/or the downhole-type artificial lift system 124. At 702, a fluctuation (e.g., irregular electrical current) of motor input power is detected by a sensor that communicates a value to the controller 150. Fluctuations of electricity inputs are not desirable as premature damage can result from such fluctuations. Therefore, a range of allowable voltages and currents can be set to protect the motor. Once the voltage and/or the current exceed the desired range, the motor can be shut down. However, restarting the ESP imposes a lot of stress on the system. Therefore, there is merit to avoid frequent shut-down and restart by altering the motor speed set point in lieu of a shut-down. At 704, no other information is detected to indicate other possible causes. That is, sensors detect no other information about the wellbore 104 or the downhole-type lift system 124 that are indicative of other potential causes. Based on the detected information, the following actions are taken by the controller 150. At 706, the motor speed is adjusted dynamically, for example, by the controller 150 dynamically altering the frequency of the VFD, to maintain performance. At 708, information gathered while detecting the fluctuating power is digitally recorded by the controller 150 in a computer readable format and sent to a monitoring center for analysis. In some instances, at 710, performance targets are reset and adjusted due to the power fluctuations.

Figures 8, 9:
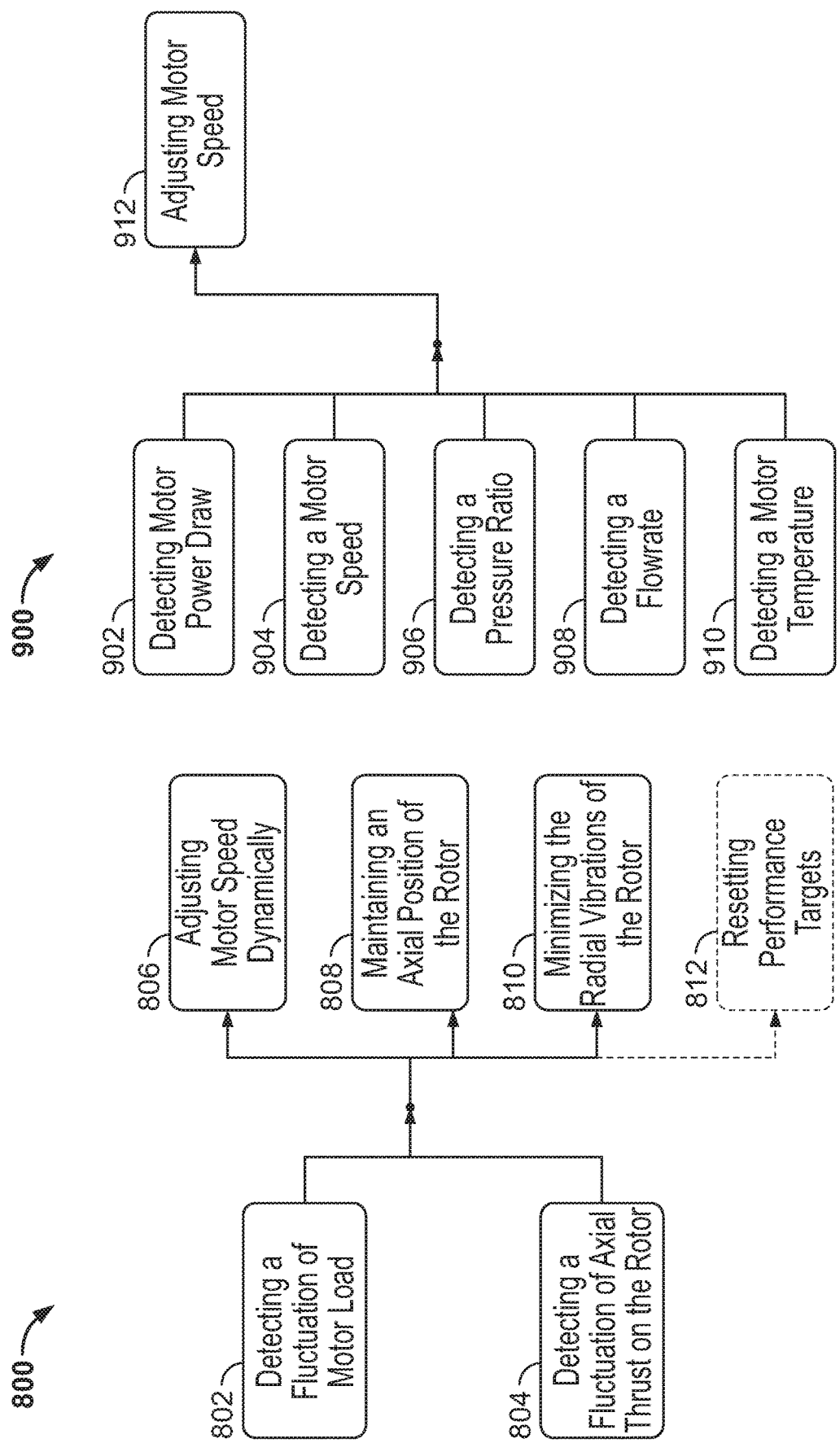
FIG. 8 is a flowchart of an example method that can be used with aspects of this disclosure.
FIG. 9 is a flowchart of an example method that can be used with aspects of this disclosure.

FIG. 8 is a flowchart of an example method 800 for minimizing performance impact due to changes in motor load or thrust bearing load. The method 800 can be applied to both downhole-type compressors and ESPs. In some implementations, the method 800 is implemented by the controller 150 and/or the downhole-type artificial lift system 124. At 802, fluctuation of motor load is detected (e.g., irregular electrical current draw) by a sensor that communicates a value to the controller 150. At 804, a fluctuation of axial thrust on the central shaft 216 is detected by a sensor that communicates a value to the controller 150. Based on the detected information, the following actions are taken by the controller. At 806, the motor speed adjusts dynamically, for example, by the controller 150 dynamically altering the frequency of the VFD, to maintain performance. At 808, axial position of the central shaft 216 is maintained by changing a magnetic field within the thrust-bearing module 214. At 810, information gathered while detecting the fluctuating loads is digitally recorded by the controller 150 in a computer readable format and sent to a monitoring center for analysis. In some instances, at 812, performance targets are reset and adjusted due to the power fluctuations.

FIG. 9 is a flowchart of an example method 900 for saving operating costs and extending the life of the downhole-type lifting device 124. The method 900 can be applied to either downhole-type compressors or ESPs. In some implementations, the method 900 is implemented by the controller 150 and/or the downhole-type artificial lift system 124. At 902, the motor power draw is detected by a sensor that communicates a value to the controller 150. At 904, the motor speed is detected by a sensor that communicates a value to the controller 150. At 906, a pressure ratio across the fluid module 200 is detected by a sensor that communicates a value to the controller 150. At 908, a flowrate through the fluid module 200 is detected by a sensor that communicates a value to the controller 150. The flowrate can be detected at the surface of the wellbore 104 or within the wellbore 104 itself. At 910, a temperature of the motor is detected by a sensor that communicates a value to the controller 150. Based on the detected information, the following actions are taken by the controller. At 912, a motor speed is adjusted, for example, by the controller 150 altering the frequency of the VFD. The motor speed is adjusted dynamically to operate at the optimum efficiency point according to the performance map of the downhole-type lifting system 124.

Figure 10:
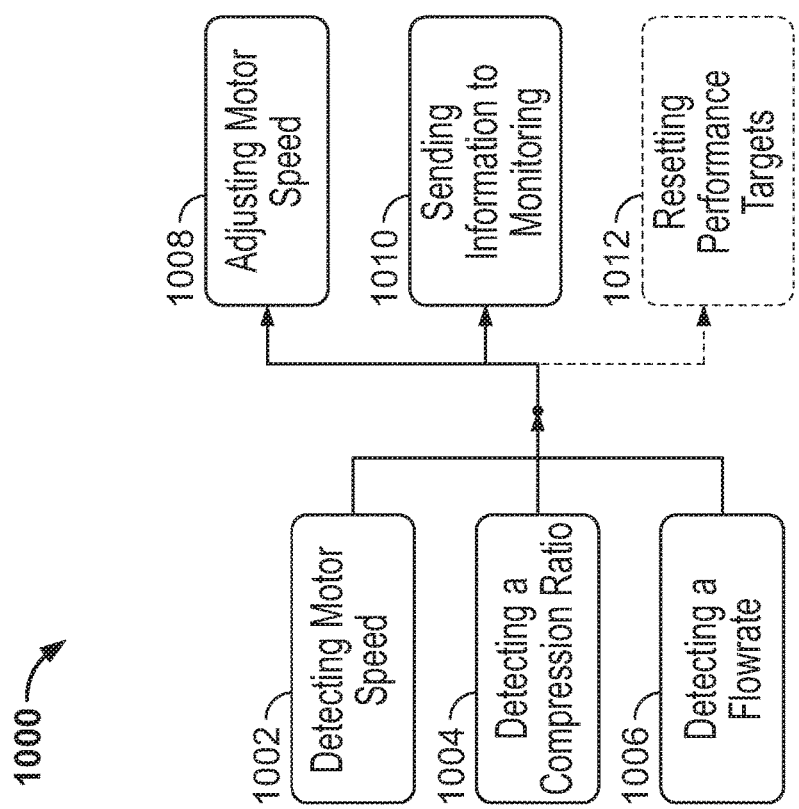
FIG. 10 is a flowchart of an example method that can be used with aspects of this disclosure.

FIG. 10 is a flowchart of an example method 1000 for handling rapid production decline to prevent surge in a downhole-type compressor. In some implementations, the method 1000 is implemented by the controller 150 and/or the downhole-type artificial lift system 124. At 1002, the motor speed is detected by a sensor that communicates a value to the controller 150. At 1004, a compression ratio across the fluid module 200 is detected by a sensor that communicates a value to the controller 150. In some instance, the compression ratio can be determined from the axial thrust of the central shaft 216. At 1006, a flowrate through the fluid module 200 is detected by a sensor that communicates a value to the controller 150. The flowrate can be detected at the surface of the wellbore 104 or within the wellbore 104 itself. Based on the detected information, the following actions are taken by the controller. At 1008, the motor speed is adjusted, for example, by the controller 150 altering the frequency of the VFD, to operate at the optimum efficiency point according to compressor performance map with declining flow rate. At 1010, information gathered while detecting the described fluctuating parameters is digitally recorded by the controller 150 in a computer readable format and sent to a monitoring center for analysis. In some instances, at 1012, performance targets are reset and adjusted due to the production decline.

Figure 11:
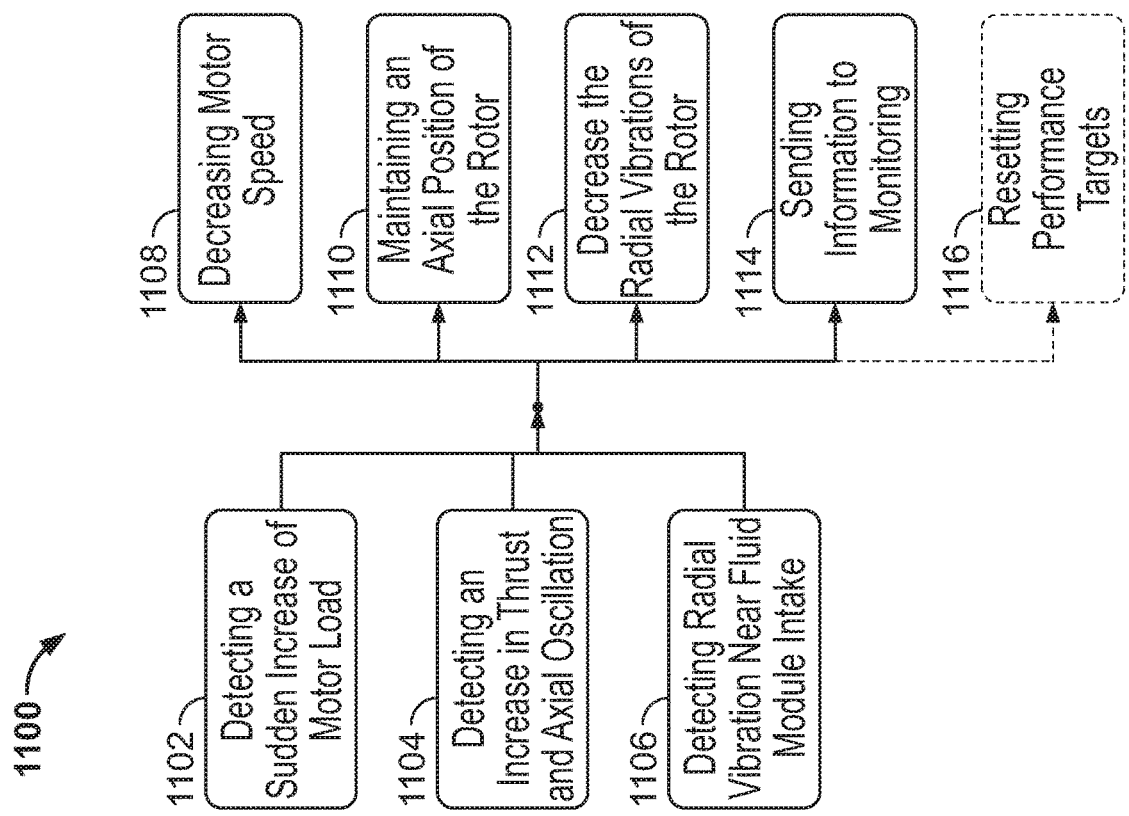
FIG. 11 is a flowchart of an example method that can be used with aspects of this disclosure.

FIG. 11 is a flowchart of an example method 1100 for protecting a downhole-type lift device 124 from large sand production. The method 1100 can be applied to either downhole-type compressors or ESPs. In some implementations, the method 1100 is implemented by the controller 150 and/or the downhole-type artificial lift system 124. At 1102, a sudden increase of motor load is detected by a sensor that communicates a value to the controller 150. At 1104, an increase of thrust in the central shaft 216 and an axial oscillation of the central shaft 216 are detected by a sensor that communicates a value to the controller 150. At 1106, a radial vibration of the central shaft 216 is detected near the intake of the fluid module 200 by a sensor that communicates a value to the controller 150. Based on the detected information, the following actions are taken by the controller. At 1108, the motor speed, for example, by the controller 150 altering the frequency of the VFD, is decreased. In some instances, if the axial oscillations and radial vibrations quickly subside, the motor speed is restored to its previous set-point. At 1110, an axial position of the central shaft 216 is maintained by changing a magnetic field within the thrust-bearing module 214. At 1112, radial vibrations in the central shaft 216 are reduced. Such a reduction can be done by the controller 150 increasing a damping factor of the magnetic bearings. At 1114, information gathered while detecting the described parameters is digitally recorded by the controller 150 in a computer readable format and sent to a monitoring center for analysis. In some instances, at 1116, performance targets are reset and adjusted due to the potential for sand production.

Figure 12:
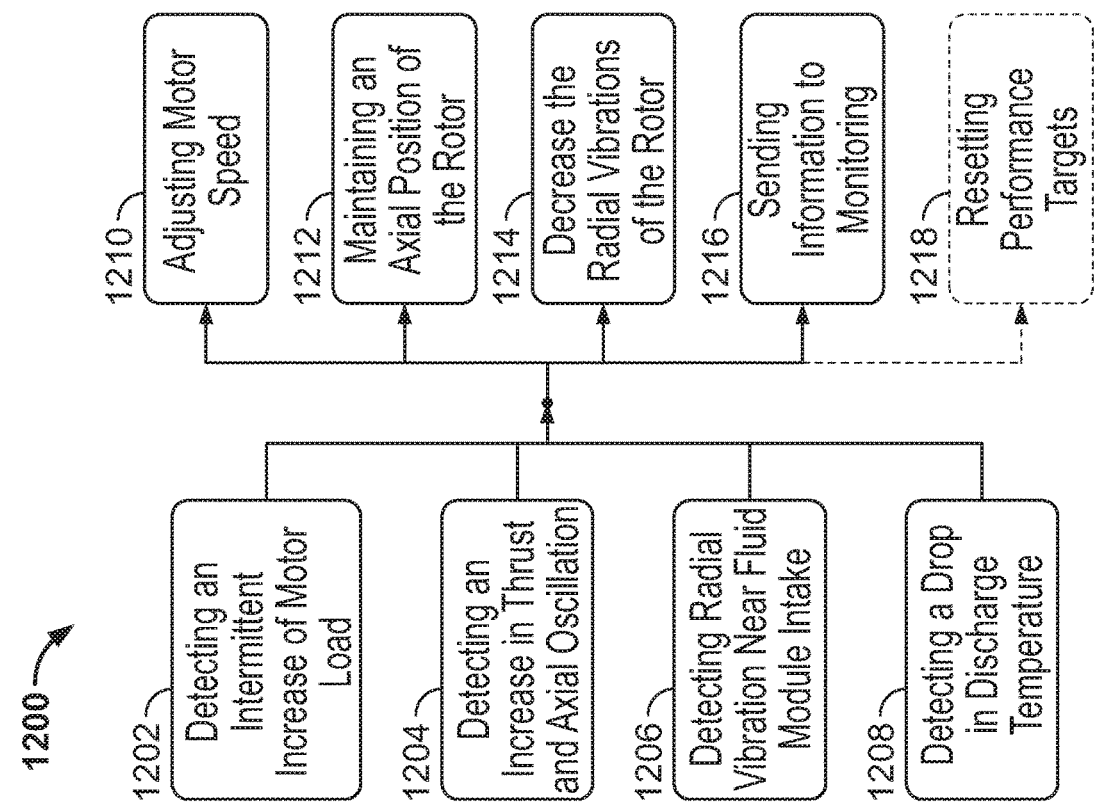
FIG. 12 is a flowchart of an example method that can be used with aspects of this disclosure.

FIG. 12 is a flowchart of an example method 1200 for protecting a downhole-type compressor from liquid slugging. In some implementations, the method 1200 is implemented by the controller 150 and/or the downhole-type artificial lift system 124. At 1202, an intermittent increase of motor load is detected by a sensor that communicates a value to the controller 150. At 1204, an increase of thrust in the central shaft 216 and an axial oscillation of the central shaft 216 are detected by a sensor that communicates a value to the controller 150. At 1206, a radial vibration of the central shaft 216 is detected near the intake of the fluid module 200 by a sensor that communicates a value to the controller 150. At 1208, a drop in discharge temperature is detected by a sensor that communicates a value to the controller 150. Based on the detected information, the following actions are taken by the controller 150. At 1210, the motor speed is adjusted dynamically with axial oscillations and radial vibrations, for example, by the controller 150 dynamically altering the frequency of the VFD. At 1212, an axial position of the central shaft 216 is maintained by changing a magnetic field within the thrust-bearing module 214. At 1214, radial vibrations in the central shaft 216 are reduced. Such a reduction can be done by the controller 150 increasing a damping factor of the magnetic bearings. At 1216, information gathered while detecting the described parameters is digitally recorded by the controller 150 in a computer readable format and sent to a monitoring center for analysis. In some instances, at 1218, performance targets are reset and adjusted due to the potential for liquid slugging.

Figure 13:
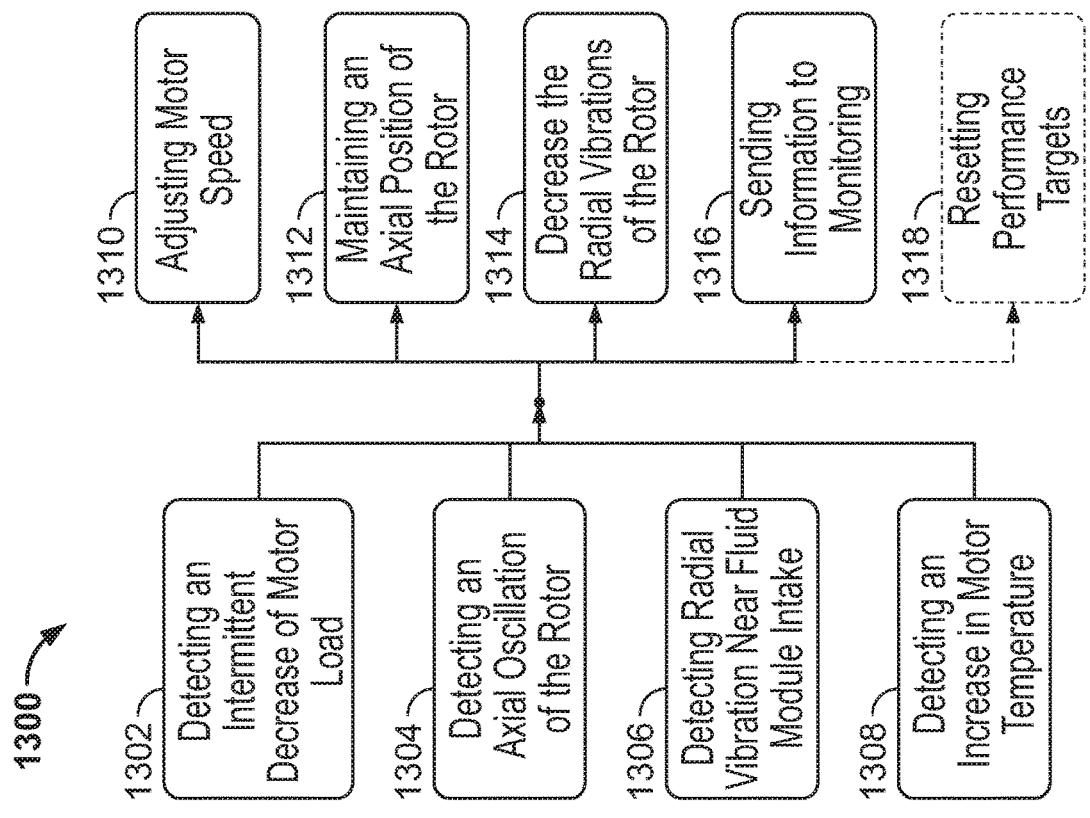
FIG. 13 is a flowchart of an example method that can be used with aspects of this disclosure.

FIG. 13 is a flowchart of an example method 1300 for protecting an ESP motor from gas slugging. In some implementations, the method 1300 is implemented by the controller 150 and/or the downhole-type artificial lift system 124. At 1302, an intermittent decrease of motor load is detected by a sensor that communicates a value to the controller 150. At 1304, an axial oscillation of the central shaft 216 is detected. by a sensor that communicates a value to the controller 150 At 1306, a radial vibration of the central shaft 216 is detected near the intake of the fluid module 200 by a sensor that communicates a value to the controller 150. At 1308, and increase in motor temperature is detected by a sensor that communicates a value to the controller 150. Based on the detected information, the following actions are taken by the controller 150. At 1310, the motor speed is adjusted dynamically with axial oscillations and radial vibrations, for example, by the controller 150 dynamically altering the frequency of the VFD. At 1312, an axial position of the central shaft 216 is maintained by changing a magnetic field within the thrust-bearing module 214. At 1314, radial vibrations in the central shaft 216 are reduced. Such a reduction can be done by the controller 150 increasing a damping factor of the magnetic bearings. At 1316, information gathered while detecting the described parameters is digitally recorded by the controller 150 in a computer readable format and sent to a monitoring center for analysis. In some instances, at 1318, performance targets are reset and adjusted due to the potential for gas slugging.

Figure 14:
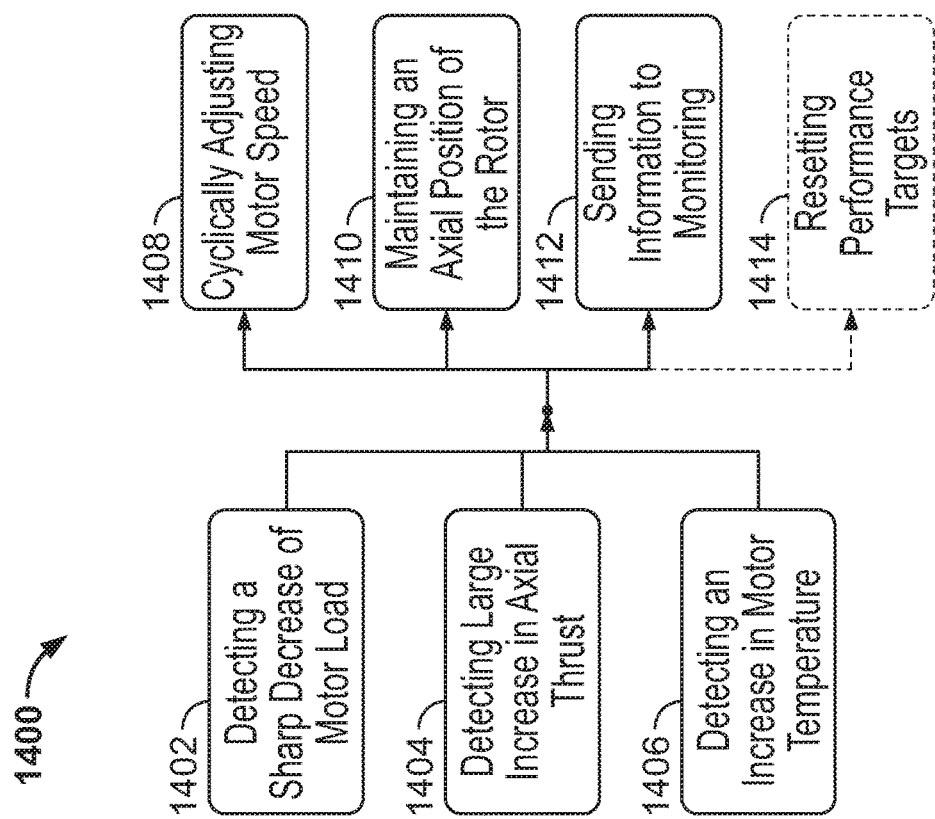
FIG. 14 is a flowchart of an example method that can be used with aspects of this disclosure.

FIG. 14 is a flowchart of an example method 1400 for protecting an ESP from gas lock. In some implementations, the method 1400 is implemented by the controller 150 and/or the downhole-type artificial lift system 124. At 1402, a sharp decrease in the motor load is detected by a sensor that communicates a value to the controller 150. At 1404, a sharp increase in axial thrust load is detected by a sensor that communicates a value to the controller 150. In the normal operation, the thrust load of the compressor should be fairly constant due to the constant pressure ratio across the intake and discharge of the compressor during steady-state operations. If there is a sudden change of the thrust loads, for example, on the order of a few seconds, such a change can indicate a sudden change of the pressure differential across the intake and discharge. Such a rapid change of pressure differential can be indicative of gas lock. At 1406, an increase in the motor temperature is detected by a sensor that communicates a value to the controller 150. Based on the detected information, the following actions are taken by the controller 150. At 1408, the motor speed is cyclically adjusted, for example, by the controller 150 cyclically adjusting the frequency of the VFD. That is, the motor speed is decreased to free the gas pocket, then increased to the initial set-point. The motor speed is kept cycling if motor load is still low. At 1410, an axial position of the central shaft 216 is maintained by changing a magnetic field within the thrust-bearing module 214. At 1412, information gathered while detecting the described parameters is digitally recorded by the controller 150 in a computer readable format and sent to a monitoring center for analysis. In some instances, at 1414, performance targets are reset and adjusted due to the potential gas locking.

Figure 15:
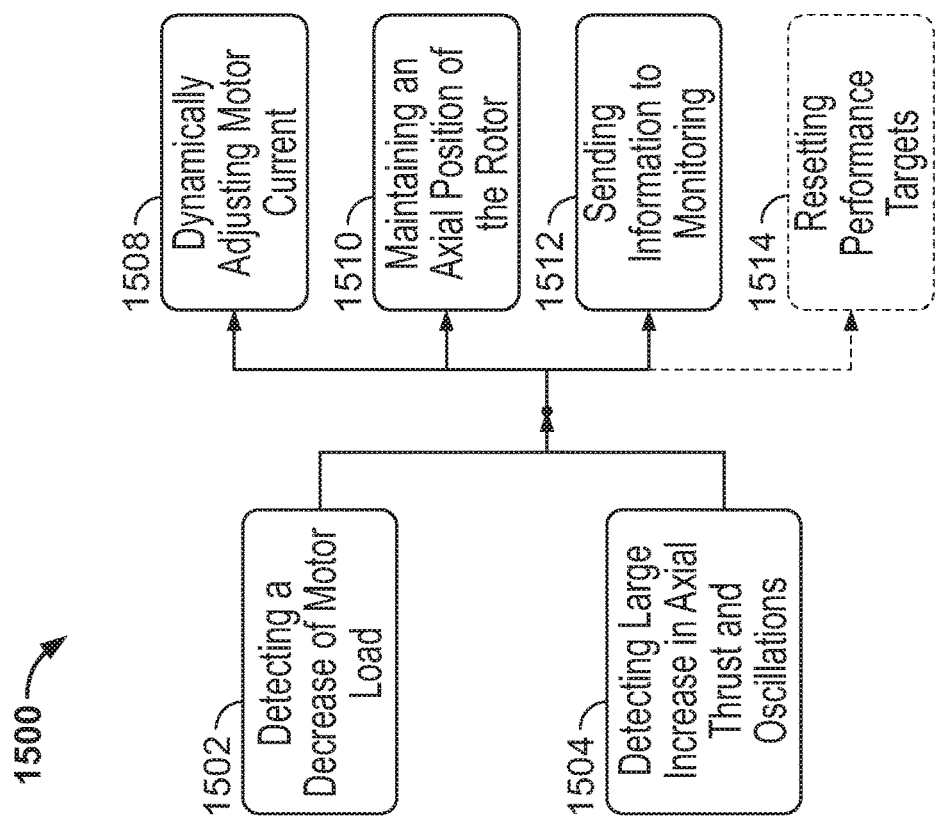
FIG. 15 is a flowchart of an example method that can be used with aspects of this disclosure.

FIG. 15 is a flowchart of an example method 1500 for optimizing an ESP's performance for emulsion scenarios. Emulsion is a dispersion of small droplets of one liquid in another liquid, which is not soluble with the other liquid, such as water and oil. In some implementations, the method 1500 is implemented by the controller 150 and/or the downhole-type artificial lift system 124. At 1502, a decrease in load motor load is detected by a sensor that communicates a value to the controller 150. At 1504, an increase of axial thrust and axial oscillations of the central shaft 216 are detected by a sensor that communicates a value to the controller 150. Based on the detected information, the following actions are taken by the controller 150. At 1508, the motor current is dynamically adjusted to achieve optimal performance of the ESP. At 1510, the axial position of the central shaft 216 is maintained by changing a magnetic field within the thrust-bearing module 214. At 1512, information gathered while detecting the described parameters is digitally recorded by the controller 150 in a computer readable format and sent to a monitoring center for analysis. In some instances, at 1514, performance targets are reset and adjusted due to the potential emulsion scenarios.

Figure 16:
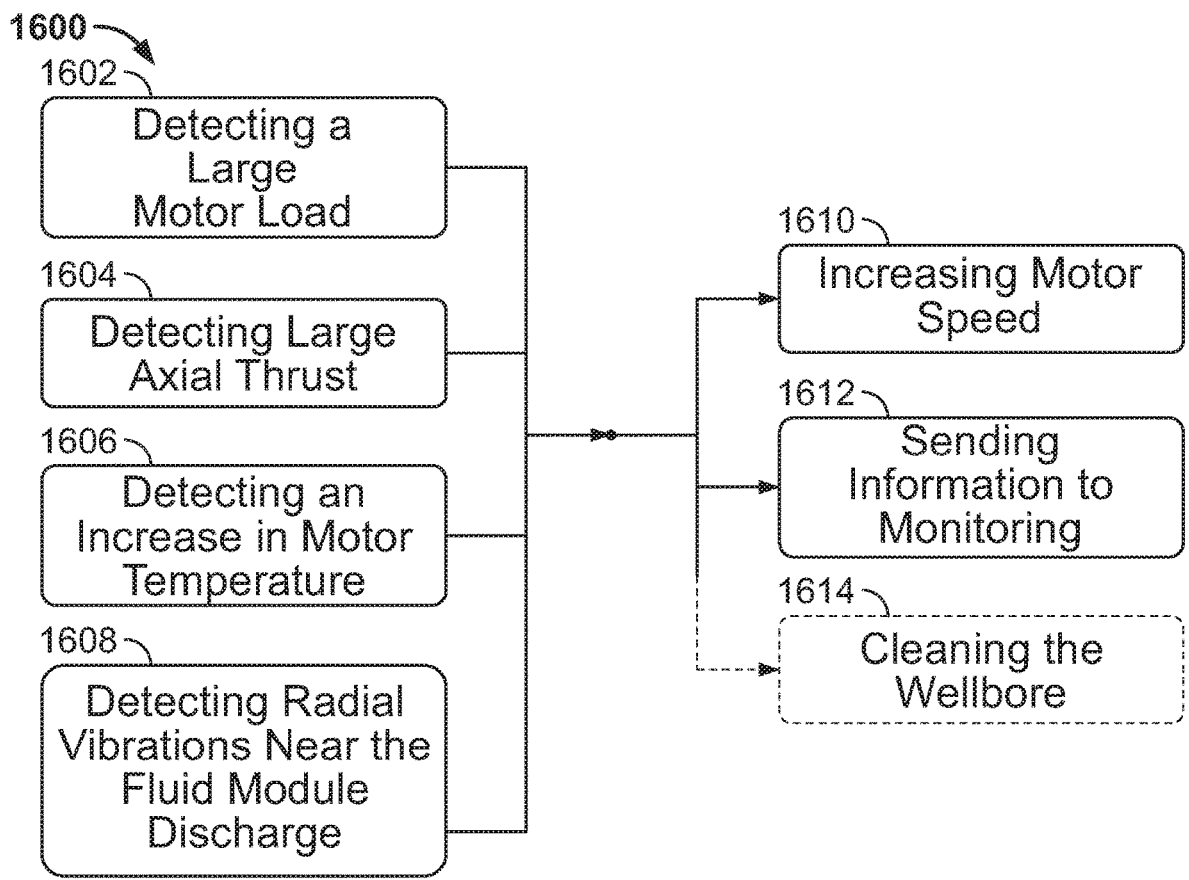
FIG. 16 is a flowchart of an example method that can be used with aspects of this disclosure.

FIG. 16 is a flowchart of an example method 1600 for re-starting with sand accumulated at the top of a downhole-type compressor. In some implementations, the method 1600 is implemented by the controller 150 and/or the downhole-type artificial lift system 124. At 1602, a large motor current is detected by a sensor that communicates a value to the controller 150. At 1604, a large thrust load on the central shaft 216 is detected by a sensor that communicates a value to the controller 150. At 1606, an increase in the motor temperature is detected by a sensor that communicates a value to the controller 150. At 1608 radial vibrations near the discharge of the fluid module 200 are detected by a sensor that communicates a value to the controller 150. Based on the detected information, the following actions are taken by the controller 150. At 1610, the motor speed is increased, for example, by the controller 150 dynamically altering the frequency of the VFD, to blow sand away from fluid module 200 discharge. The motor shuts down if the thrust load and motor temperature continue to increase. At 1612, information gathered while detecting the described parameters is digitally recorded by the controller 150 in a computer readable format and sent to a monitoring center for analysis. In some instances, at 1614, the wellbore is cleaned to prevent similar sand build-up in the future.

Figure 17:
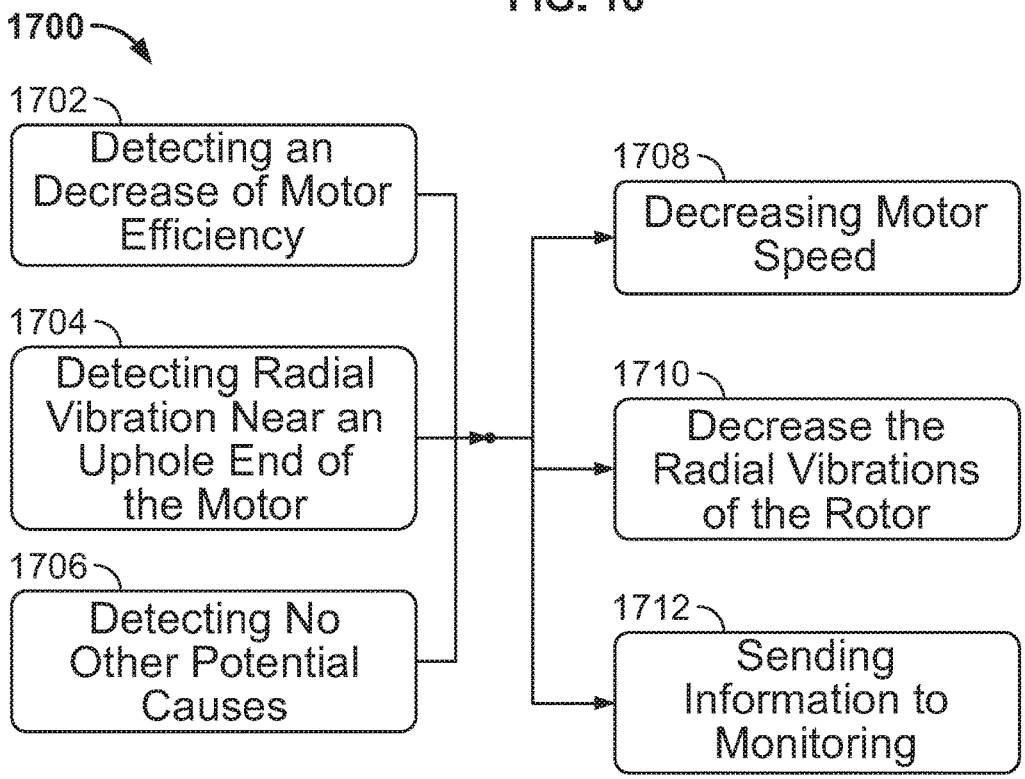
FIG. 17 is a flowchart of an example method that can be used with aspects of this disclosure.

FIG. 17 is a flowchart of an example method 1700 for prognostics of the motor 212 to maximize productive time of the downhole-type artificial lift system 124. The method 1700 can be used for both downhole-type compressors and ESPs. In some implementations, the method 1700 is implemented by the controller 150 and/or the downhole-type artificial lift system 124. At 1702, a decrease in motor efficiency is detected. That is, the power input to the motor 212 is detected by a sensor that communicates a value to the controller 150, and a power output of the motor 200 is calculated based on information from other sensors. The motor efficiency is a ratio of power input over power output. At 1704, radial vibrations are detected at the uphole end of the motor by a sensor that communicates a value to the controller 150. In this scenario, the radial vibrations have increased slowly overtime. At 1706, no other information is detected to indicate other possible causes. That is, sensors detect no other information about the wellbore 104 or the downhole-type lift system 124 that are indicative of other potential causes. Based on the detected information, the following actions are taken by the controller 150. At 1708, the motor speed is decreased, for example, by the controller 150 dynamically altering the frequency of the VFD. The motor speed is restored to its initial set-point if the radial vibrations subside. At 1710, the radial vibrations of the central shaft of the electric machine 212 are decreased. This can be achieved by the controller 150 increasing the damping factor of the radial magnetic bearings 230. At 1712, information gathered while detecting the described parameters is digitally recorded by the controller 150 in a computer readable format and sent to a monitoring center for analysis.

Figure 18:
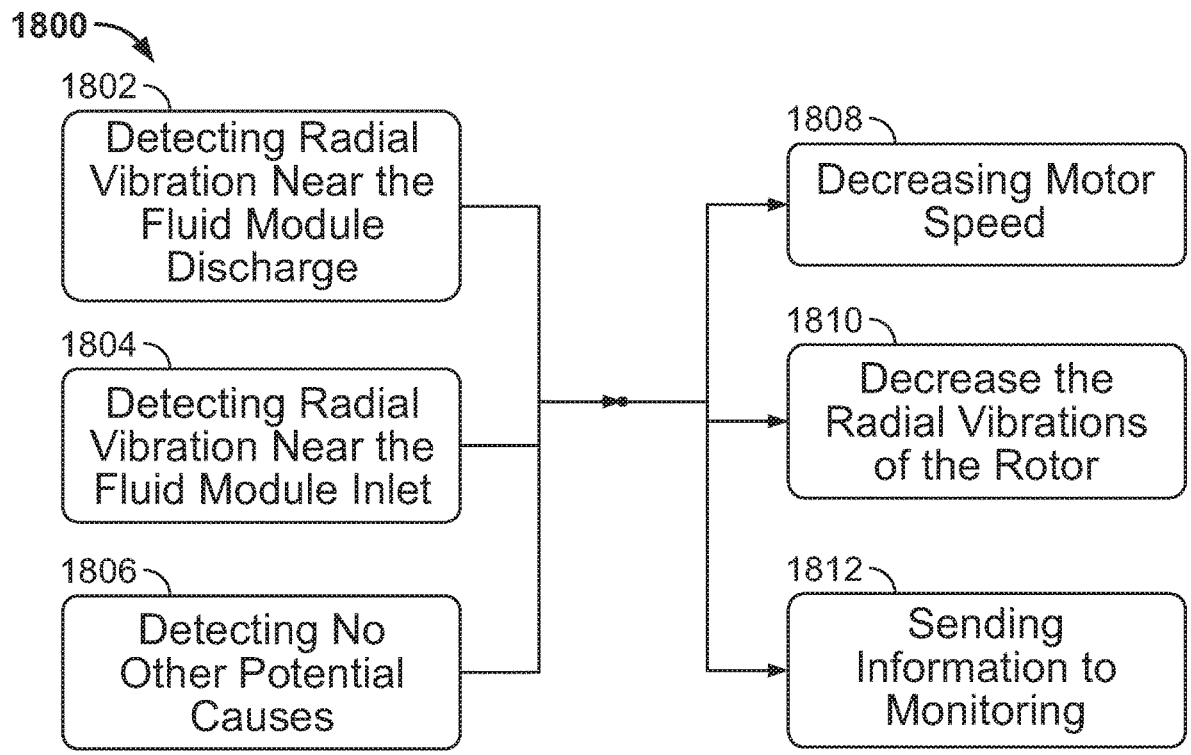
FIG. 18 is a flowchart of an example method that can be used with aspects of this disclosure.

FIG. 18 is a flowchart of an example method 1800 for prognostics of the fluid module 200 to minimize not-productive time of the downhole-type artificial lift system 124. The method 1800 can be used for downhole-type compressors, ESPs or generators. In some implementations, the method 1800 is implemented by the controller 150 and/or the downhole-type artificial lift system 124. At 1802, a radial vibration is detected near the fluid module 200 outlet 208 by a sensor that communicates a value to the controller 150. At 1804, a radial vibration is detected near the fluid module 200 inlet 206 by a sensor that communicates a value to the controller 150. In this scenario, the radial vibrations are steady. At 1806, no other information is detected to indicate other possible causes. That is, sensors detect no other information about the wellbore 104 or the downhole-type lift system 124 that are indicative of other potential causes. Based on the detected information, the following actions are taken by the controller 150. At 1808, a speed of the motor 212 is decreased, for example, by the controller 150 dynamically altering the frequency of the VFD. In some instances, if the radial vibrations quickly subside (on the order of seconds), the motor speed is restored to its previous set-point. At 1810, the radial vibrations of the fluid module 200 are decreased. This can be achieved by the controller 150 increasing the damping factor of the radial magnetic bearings 230. At 1812, information gathered while detecting the described parameters is digitally recorded by the controller 150 in a computer readable format and sent to a monitoring center for analysis. In some instances, a workover is scheduled to replace the fluid module 200.

Figure 19:
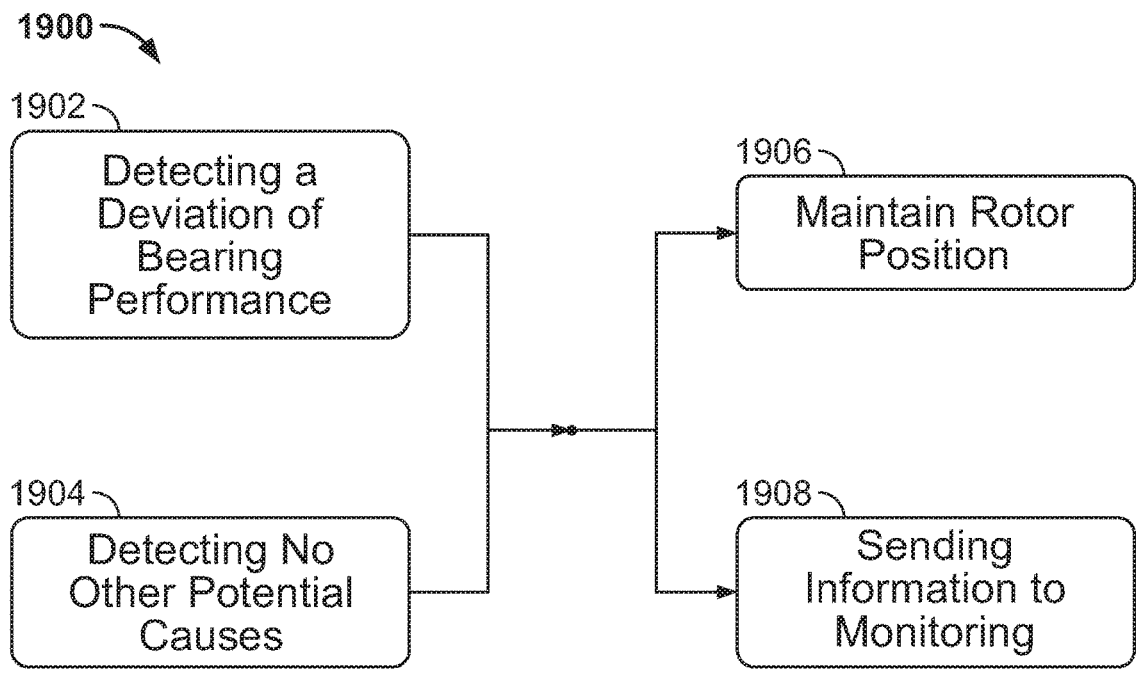
FIG. 19 is a flowchart of an example method that can be used with aspects of this disclosure.

FIG. 19 is a flowchart of an example method 1900 for prognostics of the magnetic bearings 230 and/or the thrust-bearing module 214 to minimize non-productive time of the downhole-type artificial lift system 124. In some implementations, the method 1900 is implemented by the controller 150 and/or the downhole-type artificial lift system 124. The method 1900 can be used for downhole-type compressors, generators, and ESPs. At 1902, a deviation of bearing performance is detected by a sensor (e.g., the magnetic bearing itself) that communicates a value to the controller 150. Such a deviation occurs when the position sensors and/or actuators within the bearing indicate that bearing characteristic curve significantly deviates from its original values. For example, the bearings can have a set clearance allowed for displacement before the rotor would hit a backup bearing (not shown). The backup bearing acts as a failsafe that prevents the shaft from hitting any critical components within the compressor. In some implementations, deviations of half this clearance are indicative of a potential issue; so for example, in an implementation where the clearance is 1 millimeter, a significant deviation of 0.5 millimeters can result in a corrective action. In general, the bearing tolerances can range on the order of a few thousandths of an inch. At 1904, no other information is detected to indicate other possible causes. That is, sensors detect no other information about the wellbore 104 or the downhole-type lift system 124 that are indicative of other potential causes. Based on the detected information, the following actions are taken by the controller 150. At 1906, a position of the central shaft 216 is maintained to the best of the magnetic bearings ability by changing a magnetic field within the thrust-bearing module 214. At 1908, information gathered while detecting the described parameters is digitally recorded by the controller 150 in a computer readable format and sent to a monitoring center for analysis. In some instances, a workover is scheduled to replace the bearing.

Figure 20:
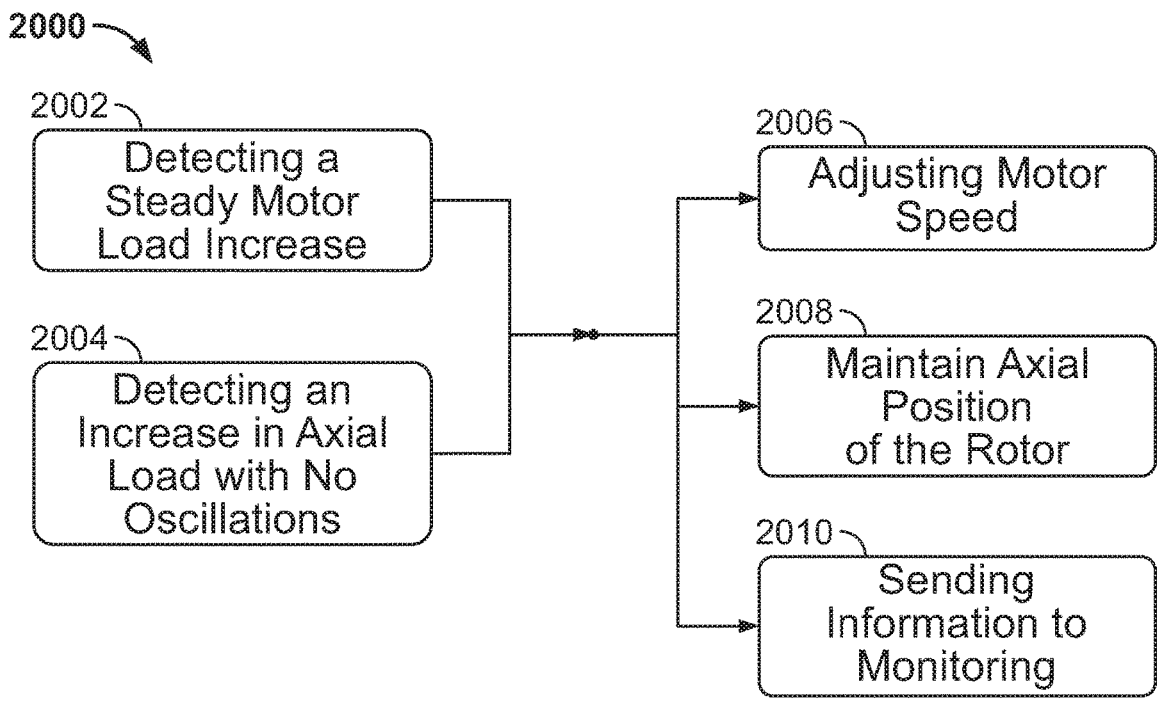
FIG. 20 is a flowchart of an example method that can be used with aspects of this disclosure.

FIG. 20 is a flowchart of an example method 2000 for prognostics of scale build-up at the inlet 206 of the fluid module 200. The method 2000 can be used for both downhole-type compressors and ESPs. In some implementations, the method 2000 is implemented by the controller 150 and/or the downhole-type artificial lift system 124. At 2002, a steady increase in the motor load is detected by a sensor that communicates a value to the controller 150. At 2004, in increase of the central shaft 216 axial load is detected without oscillations detected by a sensor that communicates a value to the controller 150. Based on the detected information, the following actions are taken by the controller 150. At 2006, the motor speed is adjusted to maintain performance of the fluid module 200, for example, by the controller 150 adjusting the frequency of the VFD. At 2008, an axial position of the central shaft 216 is maintained by changing a magnetic field within the thrust-bearing module 214. At 2010, information gathered while detecting the described parameters is digitally recorded by the controller 150 in a computer readable format and sent to a monitoring center for analysis. In some instances, a scale inhibition program can be implemented or adjusted.

Figure 21:
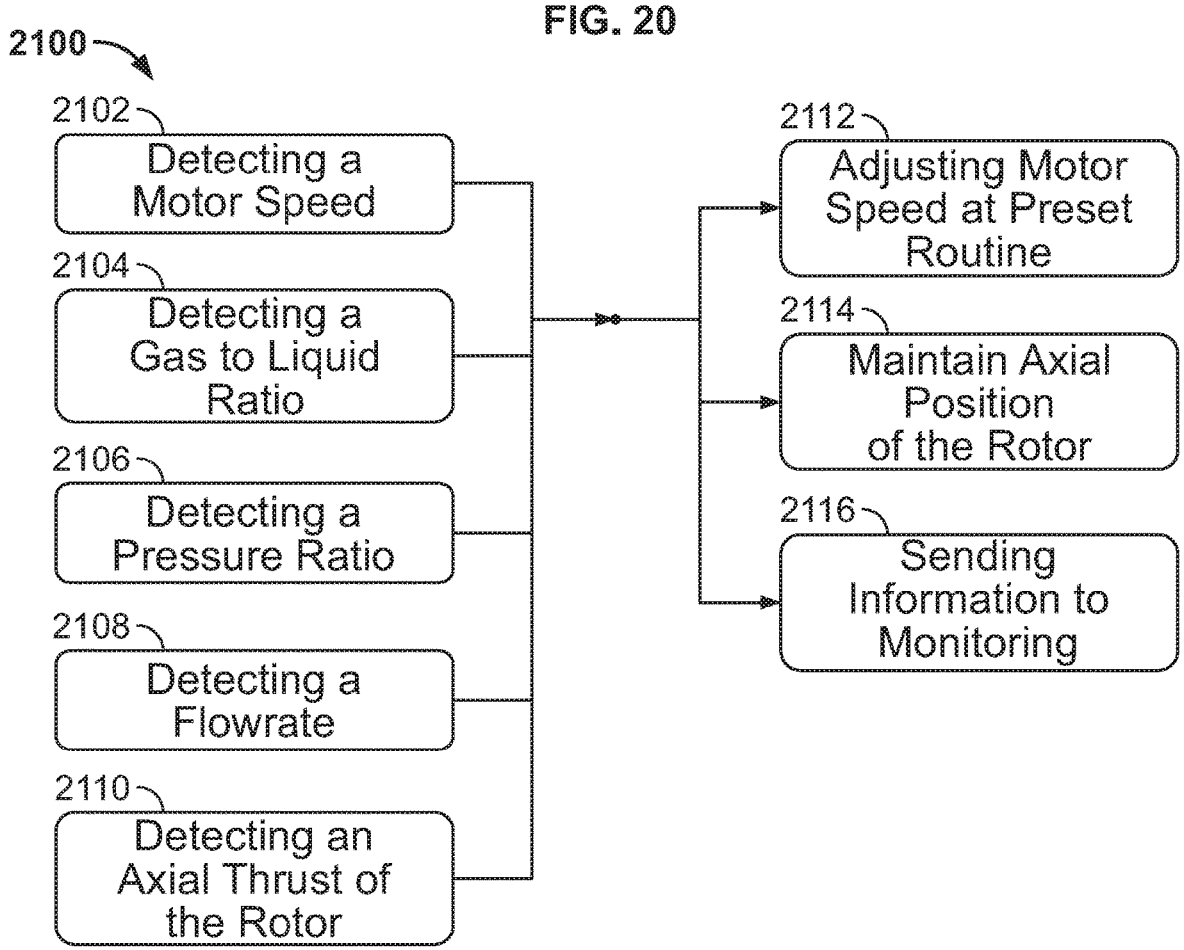
FIG. 21 is a flowchart of an example method that can be used with aspects of this disclosure.

FIG. 21 is a flowchart of an example method 2100 for automation of routine real-time reservoir diagnostics using the fluid module 200. The method 2100 can be used for downhole-type compressors, ESPs, and generators. In some implementations, the method 2100 is implemented by the controller 150 and/or the downhole-type artificial lift system 124. At 2102, a motor speed is detected oscillations detected by a sensor that communicates a value to the controller 150. At 2104, a gas to liquid ratio of the production fluid is detected oscillations detected by a sensor that communicates a value to the controller 150. At 2106, a pressure ratio across the fluid module 200 is detected by a sensor that communicates a value to the controller 150. At 2108, a flowrate through the fluid module 200 is detected by a sensor that communicates a value to the controller 150. The flowrate can be detected at the surface of the wellbore 104 or within the wellbore 104 itself. At 2110, an axial thrust load of the central shaft 216 is detected by a sensor that communicates a value to the controller 150. Based on the detected information, the following actions are taken by the controller 150. At 2112, a motor speed is adjusted according to a pre-set routine, for example, by the controller 150 altering the frequency of the VFD according to a pre-set schedule. Changes to the well characteristics are recorded and analyzed as the motor speed is adjusted. Properties of the well are determine based on these characteristics. At 2114, the axial position of the central shaft 216 is maintained by changing a magnetic field within the thrust-bearing module 214. At 2116, information gathered while detecting the described parameters is digitally recorded by the controller 150 in a computer readable format and sent to a monitoring center for analysis.

Figure 22:
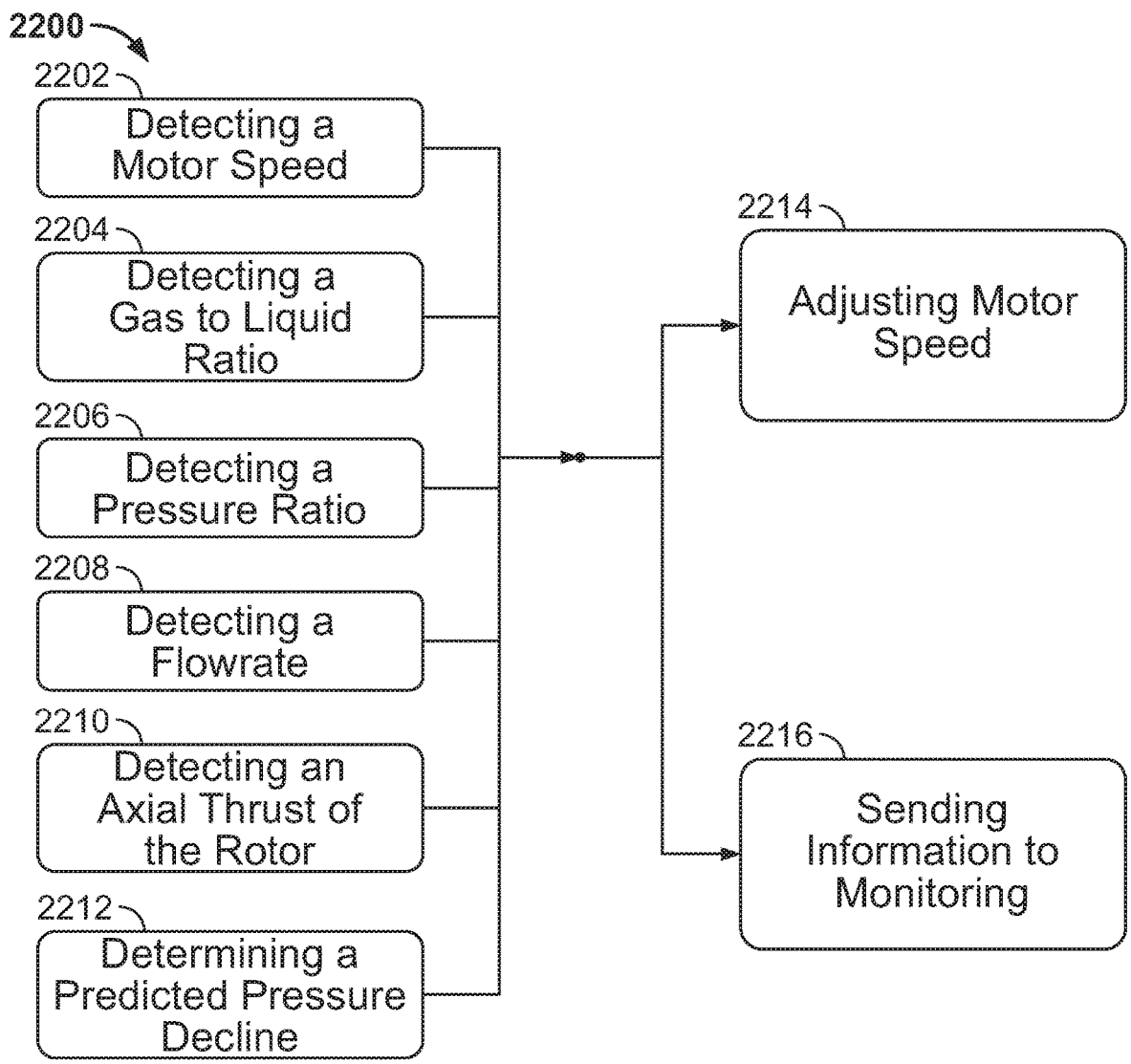
FIG. 22 is a flowchart of an exam e method that can be used with aspects of this disclosure.

FIG. 22 is a flowchart of an example method 2200 for automation of controlling the downhole-type lifting device 124 within a wellbore that has a predicted pressure decline. Such a prediction can be made with a reservoir model capable of producing a reservoir pressure versus time curve. The method 2200 can be used for both downhole-type compressors and ESPs. In some implementations, the method 2200 is implemented by the controller 150 and/or the downhole-type artificial lift system 124. At 2202, a motor speed is detected by a sensor that communicates a value to the controller 150. At 2204, a gas to liquid ratio of the production fluid is detected by a sensor that communicates a value to the controller 150. At 2206, a pressure ratio across the fluid module 200 is detected by a sensor that communicates a value to the controller 150. At 2208, a flowrate through the fluid module 200 is detected by a sensor that communicates a value to the controller 150. The flowrate can be detected at the surface of the wellbore 104 or within the wellbore 104 itself. At 2210, an axial thrust load of the central shaft 216 is detected by a sensor that communicates a value to the controller 150. At 2212, a predicted pressure decline rate is predicted based on data from previous reservoir diagnostics stored in system controller 150. Based on the detected information, the following actions are taken by the controller 150. At 2214, the motor speed is adjusted, for example, by the controller 150 dynamically altering the frequency of the VFD, to operate at the optimum efficiency point according to compressor performance map with declining flow rate calculated by the predicted pressure decline. At 2216, information gathered while detecting the described parameters is digitally recorded by the controller 150 in a computer readable format and sent to a monitoring center for analysis. In some implementations the information is fed into a reservoir model and the predicted decline rate is adjusted.

Figure 23:
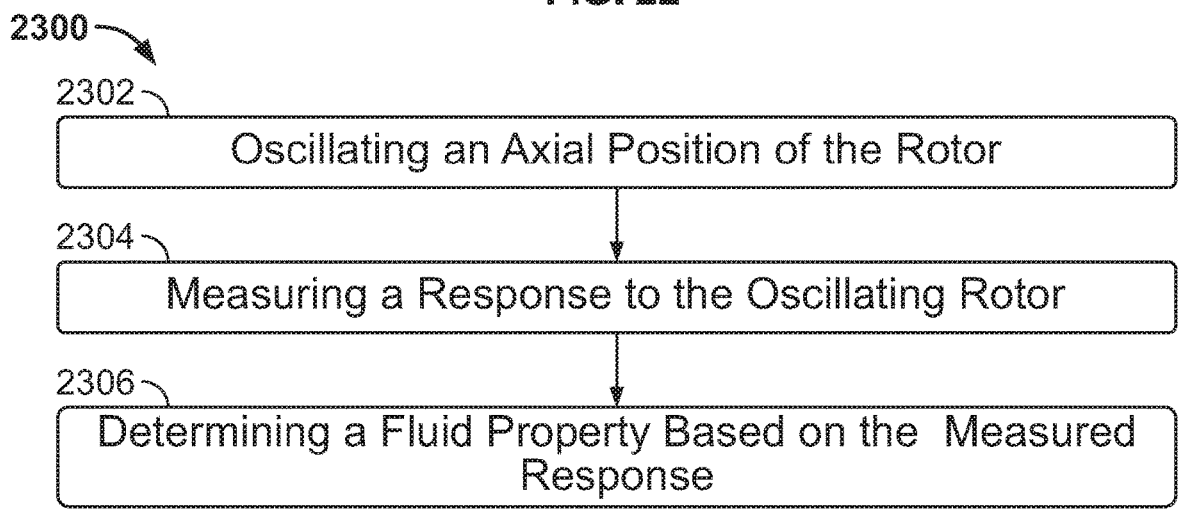
FIG. 23 is a flowchart of an example method that can be used with aspects of this disclosure.

FIG. 23 is a flowchart of an example method 2300 for determining a fluid property of the production fluid. The method 2300 can be used for downhole-type compressors, ESPs and generators. In some implementations, the method 2300 is implemented by the controller 150 and/or the downhole-type artificial lift system 124. At 2302, an axial position of the central shaft 216 is oscillated by the thrust-bearing module 214 under the control of the controller 150. At 2304, a response to the oscillating central shaft 216 is measured by a sensor (e.g., the thrust bearing module 214) that communicates a value to the controller 150. For example, a difference between the desired oscillation rate and the resulting oscillation rate can be determined. At 2306, a density and/or viscosity the fluid flowing through the downhole-type artificial lift system 124 is determined by the controller in response to the axial displacement of the central shaft 216 over time.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations previously described should not be understood as requiring such separation in all implementations, and it should be understood that the described components and systems can generally be integrated together in a single product or packaged into multiple products.

A number of implementations of the subject matter have been described. Nevertheless, it will be understood that various modifications may be made without departing from the spirit and scope of the subject matter. For example, aspects of this disclosure are applicable to downhole turbine generators as well. Accordingly, other implementations are within the scope of the following claims. Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method of controlling a downhole-type rotating machine, the method comprising:
    lowering a downhole-type rotating machine into a wellbore of a production well;
    sealing, with a seal assembly, the downhole-type rotating machine to a wall of the wellbore;
    flowing a fluid through the downhole-type rotating machine from downhole of the downhole-type rotating machine, across the seal assembly, to uphole of the downhole-type rotating machine;
    radially supporting a central shaft within an outer housing of the of the downhole-type rotating machine, the central shaft comprising a first permanent magnet and the outer housing comprising a second permanent magnet;
    measuring a parameter of a magnetic bearing supporting a rotor in operation within a stator of the downhole-type rotating machine, the downhole-type rotating machine comprising a pump or compressor, and the measured parameter comprising an axial load on the rotor;
    determining, based on the measured axial load on the rotor, a change in a pressure ratio of the fluid flowing across the pump or compressor through the downhole-type rotating machine;
    automatically adjusting a force on the rotor from the magnetic bearing based on the measured parameter and without external intervention;
    controlling a speed of the rotor based on the measured parameter;
    determining a future predicted pressure decline rate of the production well in which the downhole-type rotating machine resides, the future predicted pressure decline rate based on a predictive model;
    changing a speed of the rotor based on the future predicted pressure decline rate; and
    changing an axial position of the rotor, by the magnetic bearing, from a first position to a second position, based on the measured parameter.

2. The method of claim 1, wherein the magnetic bearing is an axial magnetic bearing.

3. The method of claim 2, wherein the measured parameter comprises a parameter indicative of axial position of the rotor, and measuring the parameter comprises measuring the axial position with the magnetic bearing.

4. The method of claim 2, wherein the measured parameter comprises an axial force on the rotor.

5. The method of claim 1, wherein the measured parameter comprises a velocity of the rotor in operation within the stator of the downhole-type rotating machine.

6. The method of claim 1, wherein the measured parameter comprises a parameter indicative of radial vibration of the rotor.

7. The method of claim 1, wherein the measured parameter comprises a parameter indicative of a temperature of fluid discharged from the downhole-type rotating machine.

8. The method of claim 1, wherein the measured parameter comprises a parameter indicative of a flowrate through the downhole-type rotating machine.

9. The method of claim 1, wherein the measured parameter comprises a parameter indicative of a torque applied to the rotor.

10. The method of claim 1, wherein the measured parameter comprises a parameter indicative of an axial displacement of the rotor over time.

11. The method of claim 10, further comprising determining a density or viscosity of the fluid flowing through the downhole-type rotating machine in response to the axial displacement of the rotor over time.

12. The method of claim 1, further comprising oscillating an axial position of the rotor in a manner selected to remove scale build-up on the downhole-type rotating machine based on the measured parameter.

13. A method of controlling a downhole-type rotating machine, the method comprising:

measuring a parameter of a magnetic bearing in response to operation of a rotor within a housing of a downhole-type rotating machine, the measured parameter comprising amplitudes of active harmonics of the rotor rotating within the magnetic bearing, the amplitudes of active harmonics including radial displacement amplitudes of the rotor;

predicting a failure mechanism based on the amplitudes of active harmonics, the failure mechanism comprising a slugging event;

changing a speed of the rotor based on the measured parameter; and changing an axial position of the rotor, by the magnetic bearing, from a first position to a second position, based on the measured parameter, wherein changing the axial position of the rotor comprises oscillating the axial position of the rotor in a manner selected to remove scale build-up on the downhole-type rotating machine.

14. The method of claim 13, wherein changing the speed of the rotor comprises reducing the speed of the rotor.

15. A method of controlling a downhole-type rotating machine, the method comprising:

measuring an operating parameter of a magnetic bearing of a downhole-type rotating machine, the operating parameter comprising an axial force on the magnetic bearing and a magnetic field emitted by the magnetic bearing;

changing an axial position of a rotor, by the magnetic bearing, from a first position to a second position, based on the measured operating parameter, wherein changing the axial position of the rotor comprises oscillating the axial position of the rotor in a manner selected to remove scale build-up on the downhole-type rotating machine;

measuring a change in axial position of the rotor over time responsive to changing the axial position of the rotor by the magnetic bearing, from the first position to the second position; and determining at least one of a density or viscosity of a downhole fluid based on the measured change in axial position over time;

determining future well-flow characteristics of the downhole fluid based on a flow assurance model; and controlling a speed of the rotor based on the future well-flow characteristics.

16. The method of claim 15, further comprises changing a speed of the rotor based on the measured operating parameter.

17. The method of claim 15, wherein changing the axial position of the rotor changes axial clearances in a pump to change a pump output.

* * * * *

UNITED STATES PATENT AND TRADEMARK OFFICE
CERTIFICATE OF CORRECTION

PATENT NO. : 12,146,394 B2
APPLICATION NO. : 16/235971
DATED : November 19, 2024
INVENTOR(S) : Kuo-Chiang Chen, Patrick McMullen and Christopher Matthew Sellers It is certified that error appears in the above-identified patent and that said Letters Patent is hereby corrected as shown below:

In the Claims

Column 26, Line 4, Claim 1, delete "of the of the" and insert -- of the --

Signed and Sealed this
Eighteenth Day of February, 2025

Coke Morgan Stewart
*Acting Director of the United States Patent and Trademark Office*